United States Patent
Miyoshi

(10) Patent No.: US 8,930,009 B2
(45) Date of Patent: Jan. 6, 2015

(54) ROBOT SYSTEM AND PROCESSED OBJECT MANUFACTURING METHOD

(75) Inventor: Tetsuya Miyoshi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 412 days.

(21) Appl. No.: 13/371,476

(22) Filed: Feb. 13, 2012

(65) Prior Publication Data

US 2013/0103179 A1    Apr. 25, 2013

(30) Foreign Application Priority Data

Oct. 20, 2011  (JP) ................. 2011-230684
Oct. 20, 2011  (JP) ................. 2011-230685

(51) Int. Cl.
*G06F 17/00* (2006.01)
*G05B 19/418* (2006.01)
*B25J 9/16* (2006.01)

(52) U.S. Cl.
CPC .......... *G05B 19/4182* (2013.01); *B25J 9/1679* (2013.01); *B25J 9/1697* (2013.01)
USPC ........................... 700/112; 382/100; 438/694

(58) Field of Classification Search
USPC ........................... 700/112; 382/100; 438/694
See application file for complete search history.

(56) References Cited

U.S. PATENT DOCUMENTS

| 2007/0009345 A1* | 1/2007 | Hall et al. ................. 414/222.01 |
| 2008/0310674 A1* | 12/2008 | Modiano et al. ............. 382/100 |
| 2009/0204260 A1* | 8/2009 | Bryne et al. .................. 700/259 |
| 2011/0207328 A1* | 8/2011 | Speakman .................... 438/694 |

FOREIGN PATENT DOCUMENTS

| JP | 58-045884 | 3/1983 |
| JP | 60-127988 | 7/1985 |
| JP | 64-002882 | 1/1989 |
| JP | 06-238584 | 8/1994 |
| JP | 07-136959 | 5/1995 |
| JP | 11-058187 | 3/1999 |
| JP | 11-262886 | 9/1999 |
| JP | 2001-277165 | 10/2001 |
| JP | 2003-237940 | 8/2003 |
| JP | 2007-030087 | 2/2007 |

OTHER PUBLICATIONS

Japanese Office Action for corresponding JP Application No. 2011-230684, Aug. 21, 2013.
Chinese Office Action for corresponding CN Application No. 201210039248.X, Sep. 3, 2014.

* cited by examiner

*Primary Examiner* — Mohammad Ali
*Assistant Examiner* — Anthony Whittington
(74) *Attorney, Agent, or Firm* — Mori & Ward, LLP

(57) ABSTRACT

A robot system includes transport means which transports an object, first detecting means which detects a three-dimensional shape of the object transported on a transport path by the transport means, a robot which performs a predetermined task on the object transported on the transport path by the transport means, means which generates an operation command to the robot, and means which corrects the operation command based on a detection result by the first detecting means.

13 Claims, 18 Drawing Sheets

ROBOT SYSTEM AND PROCESSED OBJECT MANUFACTURING METHOD

CROSS-REFERENCE TO RELATED APPLICATION

The present application claims priority from Japanese Patent Applications No. 2011-230684, which was filed on Oct. 20, 2011, and No. 2011-230685, which was filed on Oct. 20, 2011, the disclosures of which are incorporated herein by reference in its entirety.

FIELD OF THE INVENTION

The embodiment of this disclosure relates to a robot system and a processed object manufacturing method.

DESCRIPTION OF THE RELATED ART

Japanese patent laid-open H11-262886 discloses techniques for performing a predetermined task on an object that is transported on a transport path by a transport device.

SUMMARY OF THE INVENTION

According to one aspect of the disclosure, there is provided a robot system, comprising: a transport device which transports an object; a first sensor which detects a three-dimensional shape of the object transported on a transport path by the transport device; a robot which performs a predetermined task on the object transported on the transport path by the transport device; and a controller configured to operate the robot, wherein the controller comprises a command outputting portion which corrects the operation command based on a detection result by the first sensor.

According to another aspect of the disclosure, there is provided a processed object manufacturing method performed by use of at least one robot for processing an object, comprising: a transporting that transports the object on a transport path; a detecting that detects a three-dimensional shape of the object transported on the transport path by means of a first sensor; a controlling that controls the robot so that a tool installed to the robot is made to contact a contact target area of the object when the object is transported within a movable range of the tool, based on a detection result by the first sensor, and lift and move the object to a predetermined location; a detecting that detects a posture of the object that has been moved to the predetermined location by a second sensor; a setting that sets a processing target area of the object lifted by the tool of the robot, based on a detection result by the second sensor; and a controlling that controls the robot so that the processing target area of the object lifted by the tool is guided to a location where the processing is to be performed.

DESCRIPTION OF THE EMBODIMENTS

First embodiment of robot system and processed object manufacturing method will now be described with reference to accompanying drawings. This embodiment is an embodiment of a cut processing system targeting fresh produce (shallot, allium bakeri and so on), which serves as an example of an inconsistent object having an inconsistent individual shape.

Figure 1:
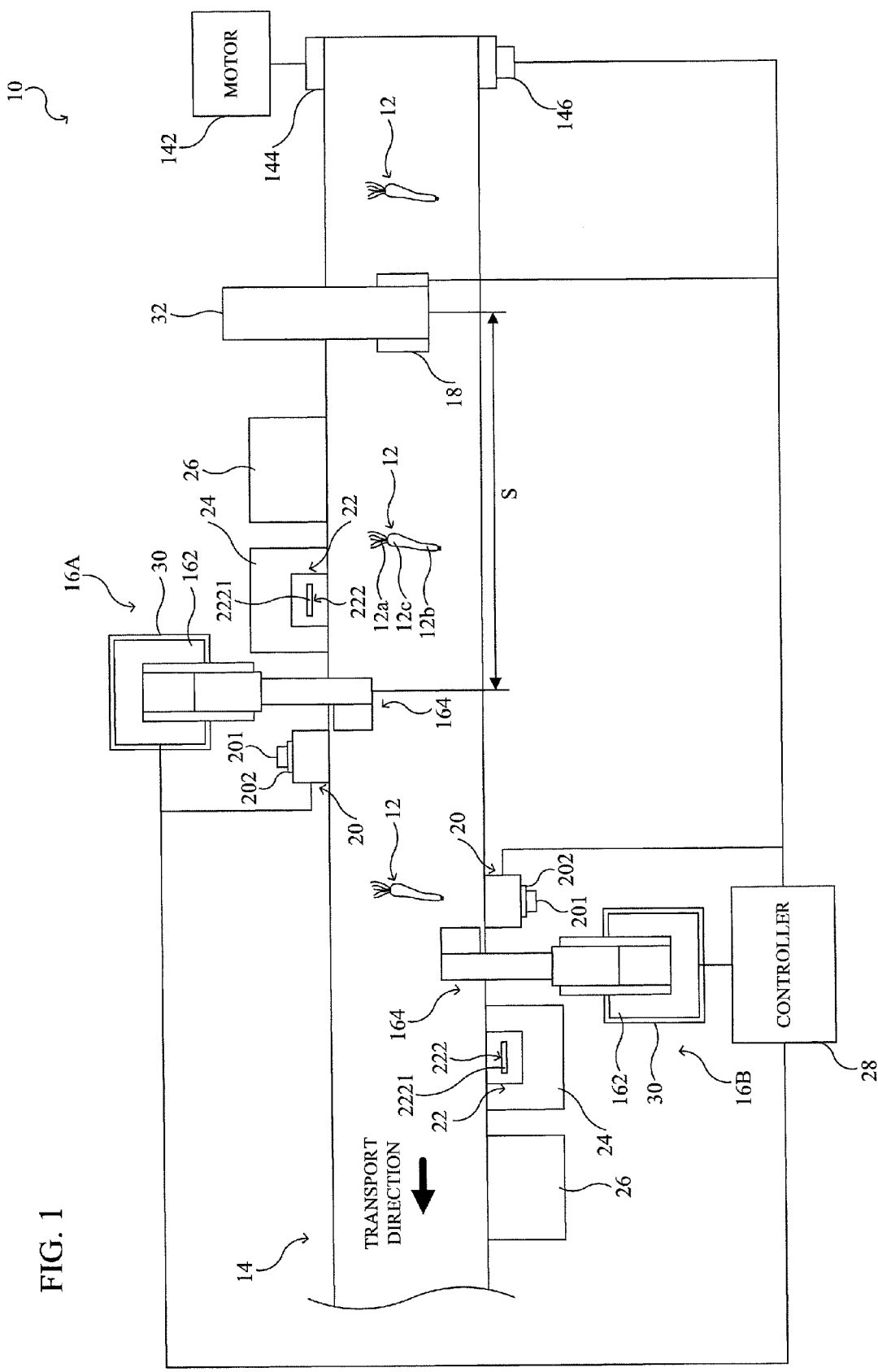
FIG. 1 is a top view schematically showing the overall configuration of a robot system of embodiment 1.
Figure 2:
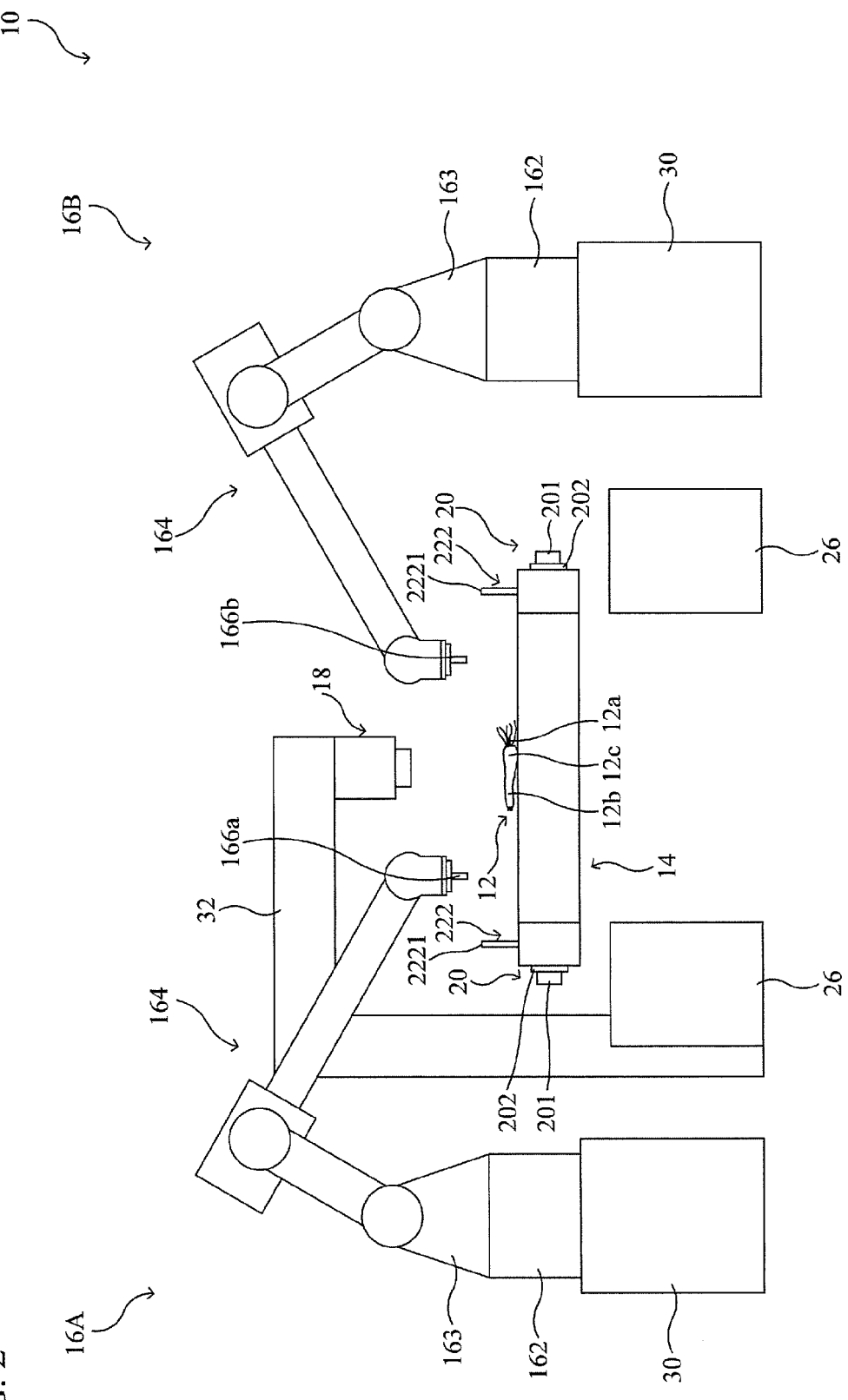
FIG. 2 is a side view schematically showing the overall configuration of the robot system.

As shown in FIG. 1 and FIG. 2, a robot system 10 (processed object manufacturing method) of this embodiment is a system that cuts (performs predetermined processing on) a shallot 12 by cutting off a root hair portion 12a and a stem portion 12b to extract a bulb portion 12c. The shallot 12 is a bulb vegetable, that is, a natural object. The shallot 12 exhibits variance in individual shape (such as the position, size, range, etc., of the root hair portion 12a, the stem portion 12b, and the bulb portion 12c). This robot system 10 comprises a conveyor 14 (transport device, transport means), a three-dimensional sensor 18 (first sensor, first detecting means), a plurality (two in this example) of robots 16A and 16B (hereinafter suitably and simply generally termed "robot 16"), and a controller 28. Note that the conveyor 14, the three-dimensional camera 18, each of the robots 16A and 16B, and the controller 28 are communicatively connected to each other. Namely, in the embodiment, the transport means recited in the claims corresponds to the conveyor 14, and the first detecting means recited in the claims corresponds to the three-dimensional camera 18.

The conveyor 14 transports the shallot 12 placed on the transport surface in one direction (from the right side to the left side in FIG. 1; from the back to the front of the paper bearing FIG. 2). The conveyor 14 comprises a motor 142, a conveyor drive portion 144 (drive portion), and an encoder 146. The motor 142 generates rotating force. The conveyor drive portion 144 is connected to the motor 142, and is rotationally driven by the rotating force of the motor 142. The encoder 146 is connected to the conveyor drive portion 144, and detects the rotating position of the conveyor drive portion 144. The detection result of the encoder 146, that is, the rotational position information of the conveyor drive portion 144, is outputted to the controller 28.

The three-dimensional sensor 18 comprises a laser light source and a camera. The three-dimensional sensor 18 is positioned on the upstream side of the transport path of the conveyor 14. Specifically, the three-dimensional sensor 18 is fixed to a substantially inverted L-shaped support member 32 fixed to a floor portion so that it is positioned above the transport path, and the laser light source and camera face downward. The laser light source is disposed in a predetermined location on the transport surface of the conveyor 14. Specifically, the laser light source is arranged so that laser light of a slit shape (linear beam) (hereinafter suitably called "laser slit light") long in the direction orthogonal to the transport direction of the conveyor 14 is continually radiated (emitted). The camera is arranged so that it receives the reflected light of an optical path that differs from the path of the laser light slit radiated by the laser light source (the reflected light having a predetermined angle with respect to the incident light). The camera continually captures an image of the radiated location of the laser slit light radiated by the laser light source and the surroundings thereof.

The shallot 12 is continually transported on the transport path at a predetermined rate. That is, the shallot 12 passes beneath the detection area of the three-dimensional sensor 18. The three-dimensional sensor 18 radiates the laser slit light from the laser light source to the shallot 12, and captures the reflected light of that laser slit light via the camera. With this arrangement, the three-dimensional sensor 18 scans the shallot 12 that passes beneath it. Then, based on the image captured by the camera, the distance to the scanned shallot 12 is calculated using the principle of triangulation, and the three-dimensional form of the shallot 12 is detected. The detection results of the three-dimensional sensor 18, that is, the captured image of the camera of the three-dimensional sensor 18 and the distance information of that captured image, are outputted to the controller 28.

Each of the robots 16A and 16B are disposed further on the downstream side of the transport path than the three-dimensional sensor 18. Specifically, the robots 16A and 16B are respectively disposed in a region on one side (the upper side in FIG. 1; the left side in FIG. 2) and in a region on the other side (the lower side in FIG. 1; the right side in FIG. 2) of the transport path in the width direction so that the two are separated to a certain degree (by approximately 1 meter, for example) along the transport path. Further, each of the robots 16A and 16B (at least the most upstream robot 16A) of the plurality of robots 16 along the transport path are disposed in a location that takes into consideration the operation of the tool described later (specifically, the suction operation of suction pads 166a and 166b). That is, the region in which the transported shallot 12 is lifted by the suction pad 166a and 166b is separated from the fixed location of the three-dimensional sensor 18 (specifically, the detection area of the shallot 12 by the three-dimensional sensor 18) by a predetermined distance S or longer along the transport path, downstream from the transport path. The predetermined distance S is, for example, the distance that the shallot 12 is transported during the processing period for acquiring the range image described later from the detection result of the three-dimensional sensor 18, which is 1 m, for example.

Each of these robots 16A and 16B is a vertically articulated robot in this example. The robots 16A and 16B comprise a base 162, a swing base 163, an arm 164, and a tool (the suction pads 166a and 166b, which are suction devices, in this example) for performing a task (corresponding to a predetermined task) of lifting and moving the shallot 12 based on a predetermined lifting method). The base 162 is fixed to the ceiling side of a pedestal 30 fixed to a floor portion (not shown). The swing base 163 is swingably installed to the base 162. The arm 164 comprises a plurality of members, and each of the members is rotatably installed to each other. The suction pads 166a and 166b (hereinafter suitably and simply generally referred to as "suction pad 166") are installed to the end of the arm 164. The suction pad 166 is made into a vacuum state by a vacuum device (not shown), and is thus capable of suctioning and lifting the shallot 12. Further, a camera 20 (image capturing device; second sensor), a cutter 22, a discard box 24, and an input box 26 are respectively installed in the area surrounding each of the robots 16A and 16B. Note that each of the cameras 20 and the controller 28 are communicatively connected to each other.

For each of these robots 16A and 16B, the suction pads 166a and 166b capable of lifting the shallot 12 by vacuum suction by creating a vacuum state via the vacuum device (not shown) are installed to the end of the arm 164. Then, each of the robots 16A and 16B operate the swing base 163 and the arm 164 in coordination. With this arrangement, the suction pads 166a and 166b contact the shallot 12 (specifically, the section of the bulb portion 12c of the shallot 12 as described later) transported on the transport path. Then, the shallot 12 is lifted via the vacuum suction (equivalent to the predetermined lifting method) of the suction pads 166a and 166b. In that lifted state, the shallot 12 is moved to a predetermined image capturing location within the field of view of a lens 201 of the adjacent camera 20. Then, the shallot 12 lifted by the suction pads 166a and 166b is moved to the location of a blade 2221 of a circular cutter 222 of the cutter 22 in the surrounding area, and is cut by the cutter 22. Subsequently, the bulb portion 12c of the shallot 12 from which the root hair portion 12a and the stem portion 12b were cut off by the cutting process and which has been lifted by the suction pads 166a and 166b is moved above the adjacent input box 26 and inputted into the input box 26 (details described later).

The cameras 20 are respectively installed near each of the robots 16A and 16B, and comprise on the front side the lens 201 and lighting 202 made of a plurality of LEDs disposed in a ring shape around the lens 201. At this time, the back side of the camera 20 faces the side surface of the conveyor 14. Further, the field of view of the lens 201 is positioned within a movable range of the suction pads 166a and 166b of the adjacent robot 16. Each of the cameras 20 is installed so that the front surface side does not face upward, making it possible to protect the lens 201 from water droplets that drop from above. Further, a backlight (not shown) is installed on the front surface side of the lens 201 of each of the cameras 20. Then, each of the cameras 20 captures an image within the field of view via the lens 201 when the shallot 12 moves to the image capturing location within the field of view of the lens 201 by the adjacent robot 16 as described above. With this arrangement, the camera 20 captures an image of the shallot 12 moved to the image capturing location, detecting the shape and posture of the shallot 12. The detection result of the each of the cameras 20, that is, the captured image of each of the cameras 20, is outputted to the controller 28.

The cutters 22 are respectively installed near each of the robots 16A and 16B. The cutter 22 comprises the circular cutter 222 that rotates in the circumferential direction. The circular cutter 222 comprises around its outer periphery the blade 2221 that cuts the shallot 12. At this time, the location of the blade 2221 of the circular cutter 222 (the position where processing is performed) is located within the movable range of the suction pad 166 of the corresponding robot 16.

The discard box 24 is a box for discarding the root hair portion 12a and the stem portion 12b of the shallot 12 cut off by the cutter 22. The discard box 24 is a box open on the ceiling side, and is disposed under each of the cutters 22.

The input box 26 is a box for inputting the bulb portion 12C of the shallot 12 from which the root hair portion 12a and the stem portion 12b have been cut off by the cutter 22. The input box 26 is a box open on the ceiling side, and is provided near each of the robots 16A and 16B.

Figure 3:
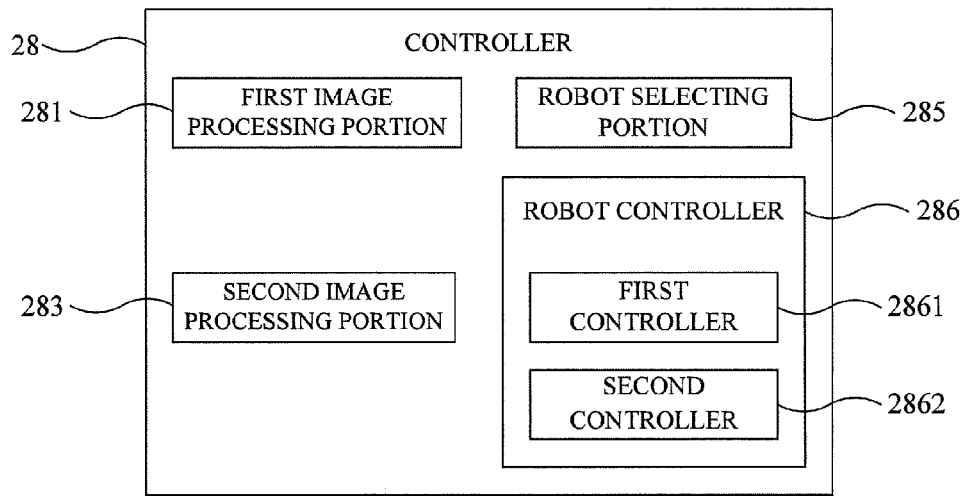
FIG. 3 is a function block diagram showing the functional configuration of the controller.

The controller 28 comprises a computer comprising an input device, display device, storage device, operational device, and the like, for controlling the operation of the three-dimensional camera 18, each of the robots 16A and 16B, the camera 20, and the like. This controller 28 comprises a first image processing portion 281 (first setting portion), a second image processing portion 283 (second setting portion), a robot selecting portion 285, and a robot controller 286, as shown in FIG. 3.

The first image processing portion 281 generates an image captured by a camera of the three-dimensional sensor 18 inputted from the three-dimensional sensor 18, and a range image (three-dimensional information) based on the distance information of that captured image. The range image is an image that expresses in an image the size of the distance from each of the areas in the image to the three-dimensional sensor 18. Then, the first image processing portion 281 detects the three-dimensional shape of the shallot 12 (hereinafter suitably called the "specific shallot 12") that passed under the three-dimensional sensor 18, based on the generated range image. With this arrangement, the first image processing portion 281 sets the suction target area (contact target area) of the specific shallot 12 (details described later). The suction target area is an area that serves as the target of the vacuum suction (contact) made by the suction pad 166 of the robot 16, that is, an area that can most likely be suctioned by the suction pad 166.

The second image processing portion 283 detects the shape and the posture of the specific shallot 12 captured in an image by the camera 20, based on the captured image of the camera 20 inputted from the camera 20. Then, the second image processing portion 283 sets the processing target area of the specific shallot 12 (details described later). The processing target area is an area that serves as the target for the overall cutting section (including the cutting start position and the cutting angle from that position) to be cut by the blade 2221.

The robot selecting portion 285 selects the robot 16 that is to process the specific shallot 12 from the plurality (two in this example) of the robots 16A and 16B. For example, the robot selecting portion 285 selects the robot 16 following a preset order (for example, an order assigned starting from the location closest to the three-dimensional sensor 18). Further, the robot selecting portion 285 may select the robot 16 from the robots 16 that are not performing any processing (that have completed processing), starting from the robot 16 having the higher priority. Possible examples of the robot 16 having a higher priority include the robot 16 having a higher priority when ranked in the order of closeness to the three-dimensional sensor 18, and the robot 16 having faster completion timing during the previous processing. Further, the robot selecting portion 285 may randomly select the robot 16 that is not performing any processing (that has completed processing). Further, the robot selecting portion 285 may detect the transport location (the location in the width direction of the conveyor 14) of the specific shallot 12 based on the captured image of the camera of the three-dimensional sensor 18 inputted from the three-dimensional sensor 18, and select the robot 16 installed on the side of the detected location (for example, on one side in the width direction of the conveyor 14).

The robot controller 286 is configured to operate the robots 16A and 16B. The robot controller 286 comprises a first controller 2861 (first control portion) and a second controller 2862 (second control portion).

The first controller 2861 calculates the amount of movement of the shallot 12 transported on the transport path based on the rotational position information of the conveyor drive portion 144 inputted from the encoder 146 of the conveyor 14. Then, the first controller 2861 calculates the timing at which the specific shallot 12 will be transported within the movable range of the suction pad 166 of the robot 16 based on the calculated amount of movement of the shallot 12 and the position of the suction target area of the shallot 12 set by the first image processing portion 281. This timing, in other words, is the operation start timing of the robot 16 for suctioning and lifting the suction target area of the specific shallot 12 using the suction pad 166. Further, a first controller 2831 operates the swing base 163 and the arm 164 in coordination at the calculated operation start timing. With this arrangement, the operation of each of the robots 16A and 16B is controlled (details described later), the suction pad 166 contacts the suction target area of the specific shallot 12, and the specific shallot 12 is lifted by the suction. Furthermore, at this time the specific shallot 12 moves to the image capturing location within the field of view of the lens 201 of the adjacent camera 20.

The second controller 2862 operates the swing base 163 and the arm 164 in coordination. With this arrangement, the operation of each of the robots 16A and 16B is controlled (details described later), and the processing target area set by the second image processing portion 283 within the specific shallot 12 lifted by the suction pad 166 is guided to the location of the blade 2221 (the location where processing is to be performed).

The following describes an example of the operation of the robot system 10 using FIG. 4 to FIG. 10.

Figure 4:
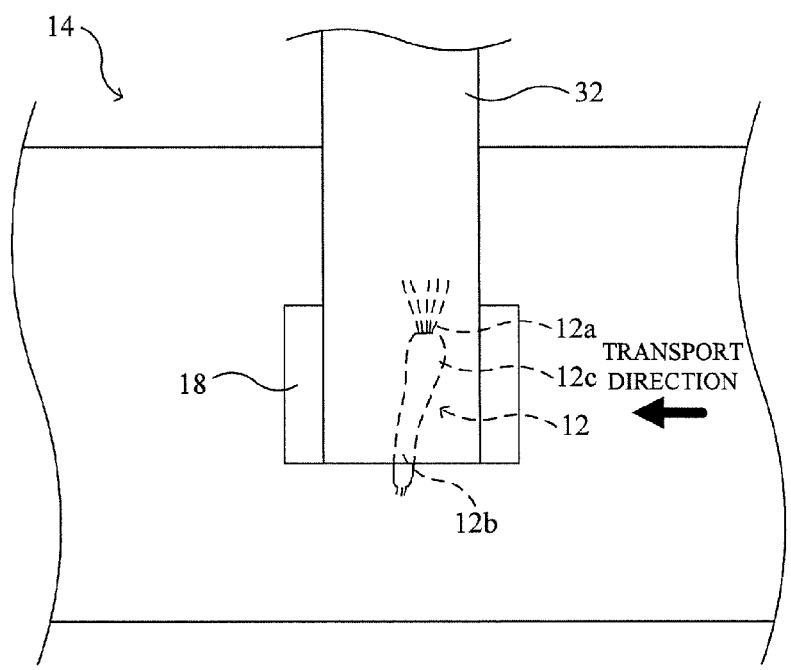
FIG. 4 is an explanatory drawing explaining an example of the operation of the robot system.
Figure 5A:
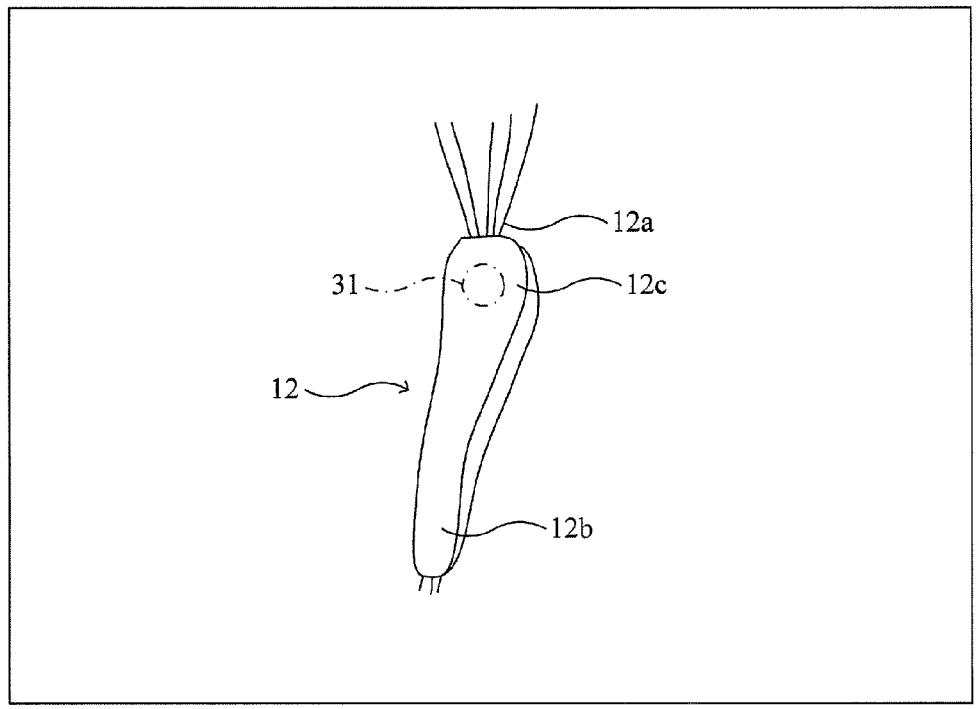
FIG. 5 is an explanatory drawing explaining an example of the operation of the robot system.
Figure 5B:
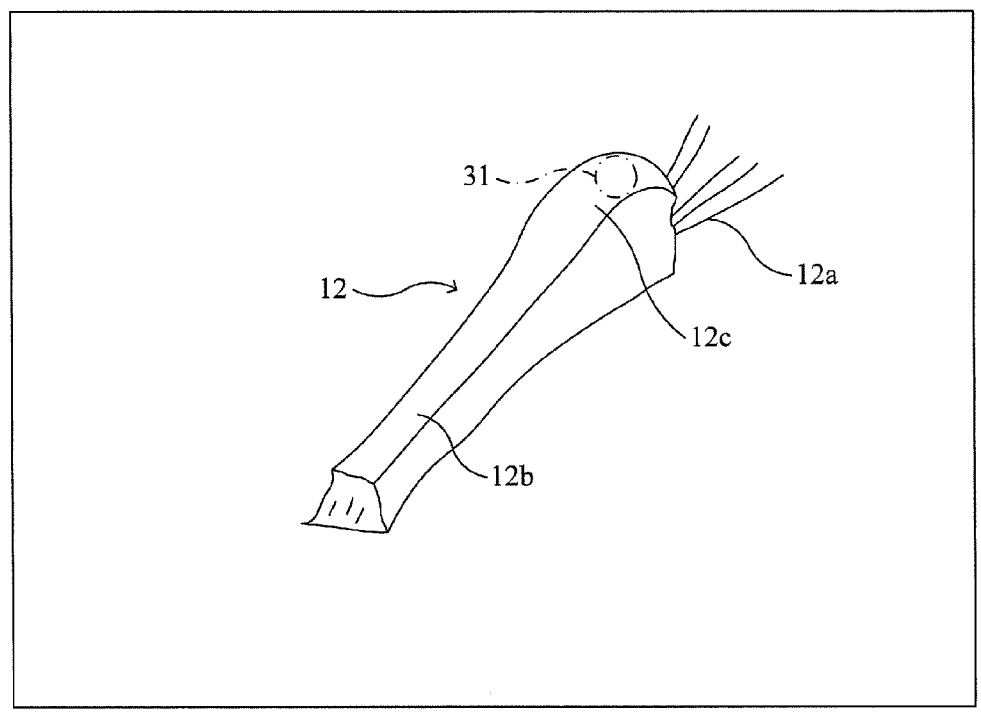

First, as shown in FIG. 4, the shallot 12 continuously transported on the upstream side of the transport path at a predetermined rate is detected by the three-dimensional sensor 18 when it passes under the three-dimensional sensor 18. Then, that detection result, that is, the captured image of the camera of the three-dimensional sensor 18 and the distance information of that captured image, is outputted to the controller 28. The first image processing portion 281 of the controller 28 then generates the range image based on the inputted captured image of the camera of the three-dimensional sensor 18 and the distance information of that captured image. FIG. 5A and FIG. 5B show schematic diagrams that form a model of an example of the generated range image. Note that the range images shown in FIG. 5A and FIG. 5B are images that form a model of the same information from different viewpoints. As shown in FIG. 5A and FIG. 5B, the shape of the specific shallot 12 that passed under the three-dimensional sensor 18 is shown in three dimensions in the generated range image. The first image processing portion 281 detects the three-dimensional shape of the specific shallot 12 based on this range image, and sets the suction target area of the specific shallot 12. The following describes this embodiment under the premise that an obstacle that hinders vacuum suctioning by the suction pad 166 does not exist above the bulb portion 12c of the specific shallot 12 shown in the generated range image. Such an obstacle would be, for example, a hair of the root hair portion 12a or a leaf of the stem portion 12b. The first image processing portion 281 detects the highest area of the specific shallot 12 that comprises a flat surface area of a predetermined size (1 cm³, for example) or greater (the area indicated by reference numeral 31 in the example shown in FIG. 5A and FIG. 5B). Then, the first image processing portion 281 sets that detected area as the suction target area of the specific shallot 12.

Figure 6:
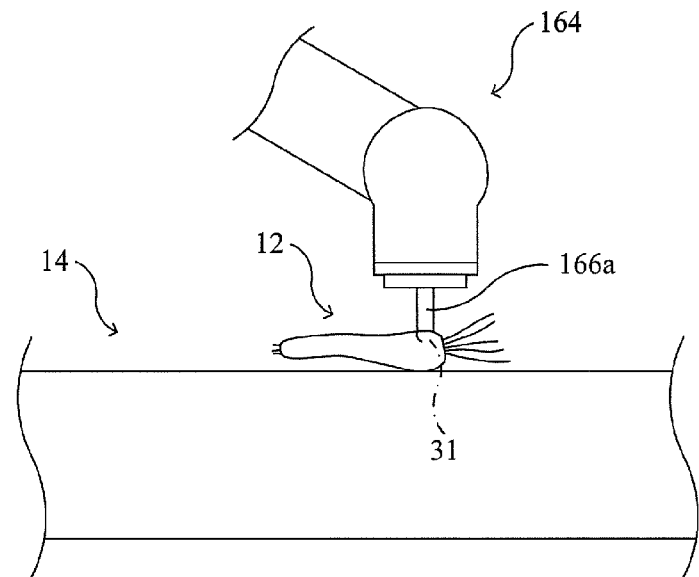
FIG. 6 is an explanatory drawing explaining an example of the operation of the robot system.
Figure 7:
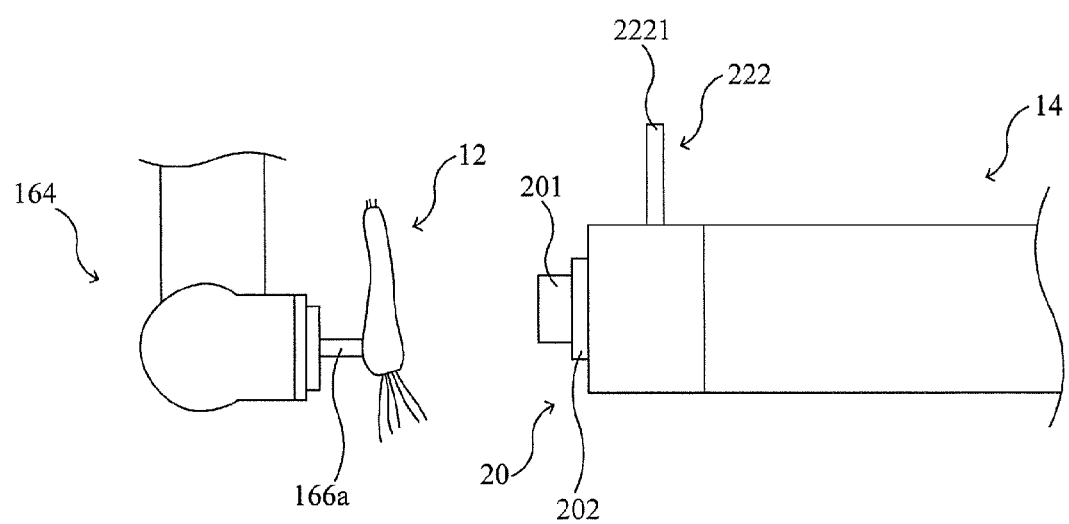
FIG. 7 is an explanatory drawing explaining an example of the operation of the robot system.

Subsequently, as shown in FIG. 6, the robot 16 (the robot 16A in this example) selected by the robot selecting portion 285 operates the swing base 163 and the arm 164 in coordination based on the operation start timing calculated by the first controller 2861, via the control of the first controller 2861 of the robot controller 286. With this arrangement, the robot 16 makes the suction pad 166 (the suction pad 166a in this example) contact the suction target area (the area indicated by reference numeral 31 in the example shown in FIG. 6) of the specific shallot 12 transported on the transport path. Then, as shown in FIG. 7, after the specific shallot 12 is lifted by the vacuum suction caused by the suction pad 166, the swing base 163 and the arm 164 are operated in coordination to assume a preset and predetermined imaging position. With this arrangement, the lifted specific shallot 12 moves to the image capturing location within the field of view of the lens 201 of the adjacent camera 20.

Figure 8A:
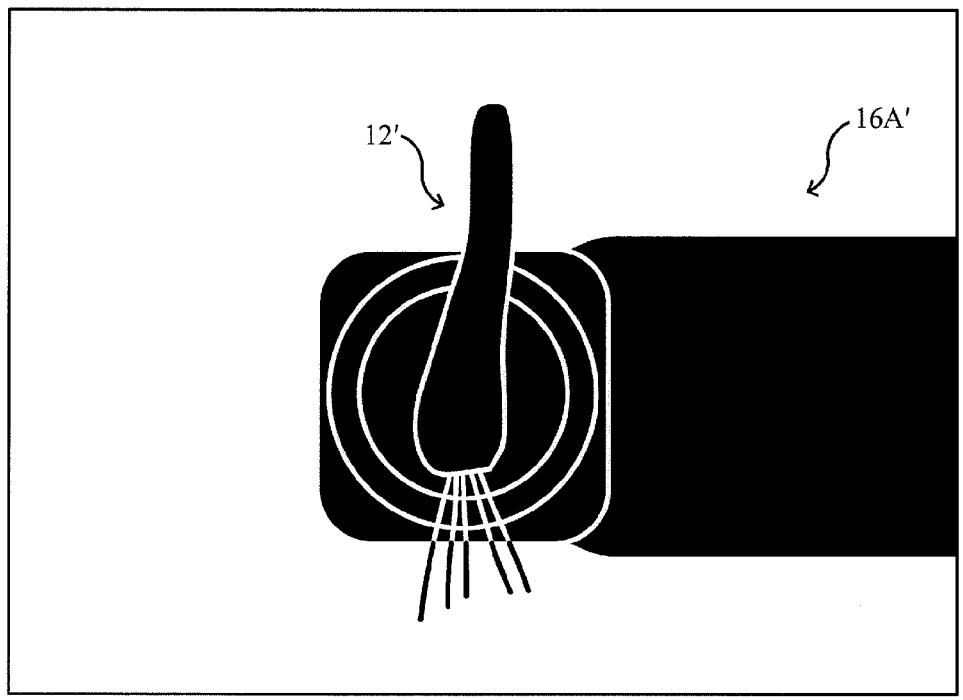
FIG. 8 is an explanatory drawing explaining an example of the operation of the robot system.
Figure 8B:
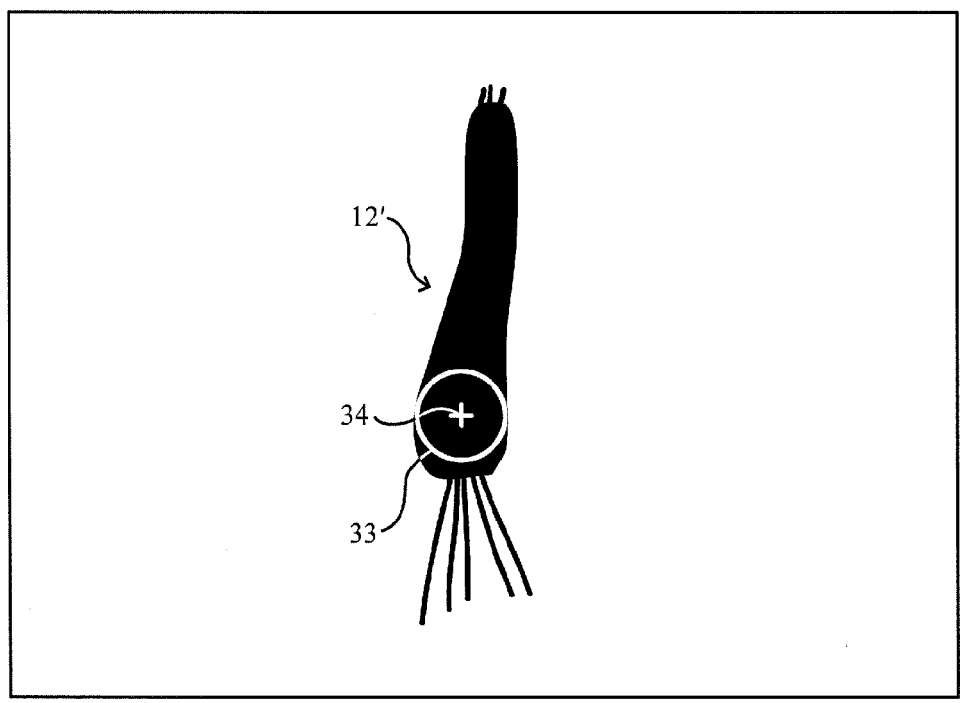
Figure 9A:
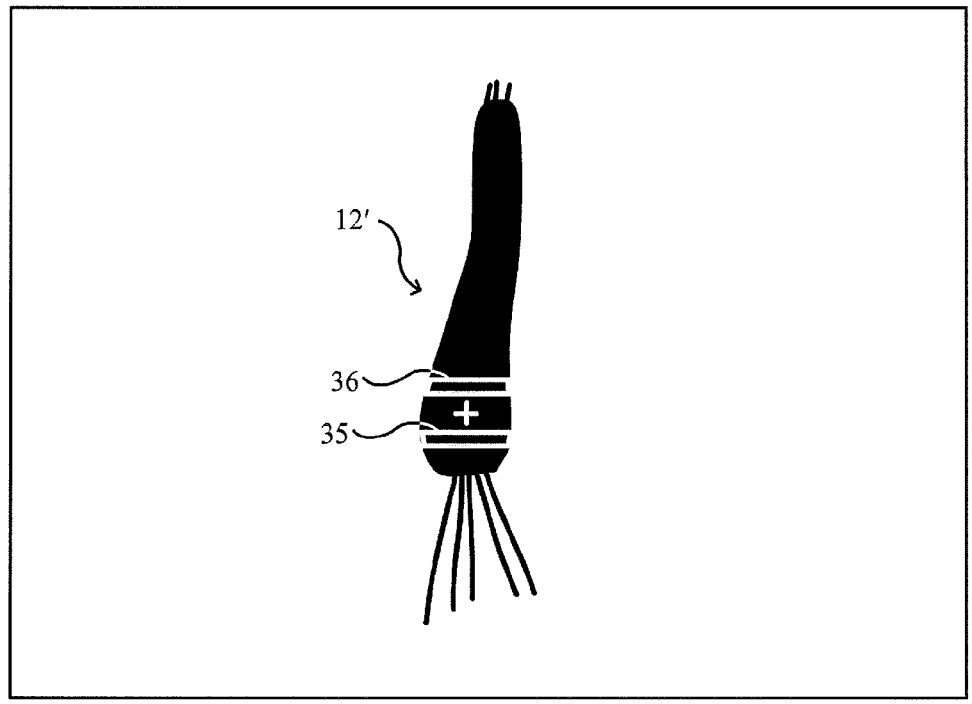
FIG. 9 is an explanatory drawing explaining an example of the operation of the robot system.
Figure 9B:
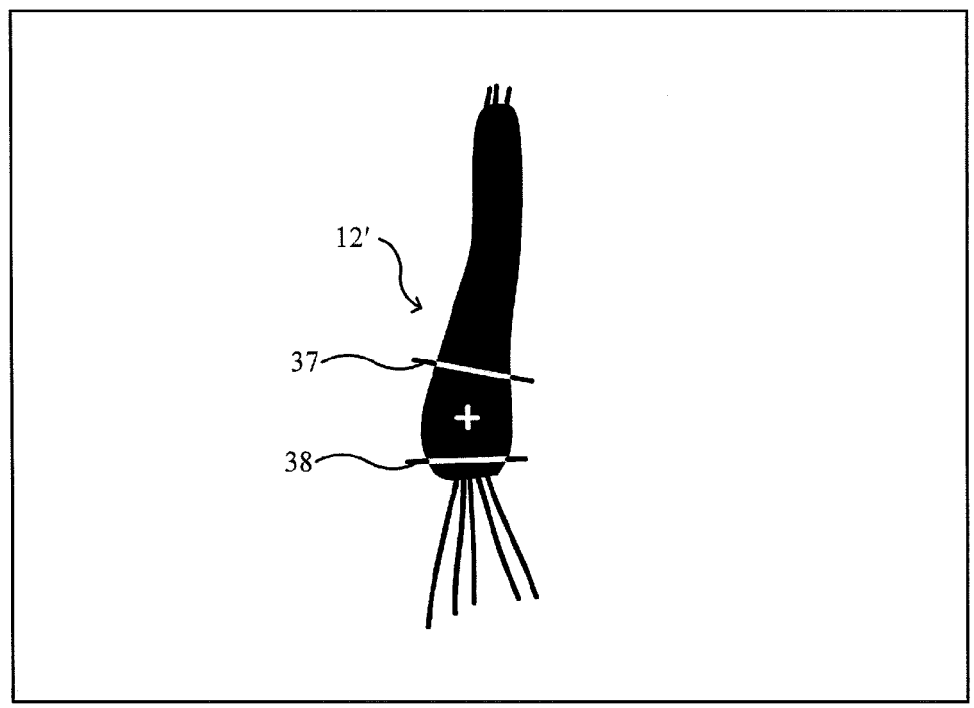

Then, the camera 20 captures an image of the robot 16 in the imaging position and the specific shallot 12 moved to the image capturing location located within the field of view of the lens 201. Then, that captured image is outputted to the controller 28. FIG. 8A shows a schematic view of a model of an example of the captured image by the camera 20, the image being inputted to the controller 28 from the camera 20. As shown in FIG. 8A, the shape and the posture of the robot 16 and the specific shallot 12 are expressed in two dimensions in the captured image of the camera 20. The second image processing portion 283 of the controller 28 detects the shape and posture of the specific shallot 12 and sets the processing target area of the specific shallot 12 based on this captured image. According to this embodiment, the second image processing portion 283 first generates an image (an image 12' of the specific shallot 12 only) that excludes an image 16A' of the robot 16A from the captured image of the camera 20, as shown in FIG. 8A. Subsequently, the second image processing portion 283, as shown in FIG. 8B, calculates the maximum inscribed circle (the circle indicated by reference numeral 33 in the example shown in FIG. 8B) of the image 12' of the specific shallot 12 shown in the generated image, and finds the center position of that calculated maximum inscribed circle. Then, the second image processing portion 283 sets the calculated center position as the center of gravity (the location indicated by reference numeral 34 in the example shown in FIG. 8B) of the image 12' of the specific shallot 12. Subsequently, the second image processing portion 283, as shown in FIG. 9A, compares the surface area of a predetermined range on one side (the range indicated by reference numeral 35 in the example shown in FIG. 9A) with the surface area of a predetermined range on the other side (the range indicated by reference numeral 36 shown in FIG. 9A) of the center of gravity of the found image 12' of the specific shallot 12. Then, the second image processing portion 283 determines that the side with the larger surface area (the side of the range indicated by reference numeral 35 in the example shown in FIG. 9A) is the side of the root hair portion 12a, and the side with the smaller surface area (the side of the range indicated by the reference numeral 36 shown in FIG. 9A) is the side of the stem portion 12b. Then, the second image processing portion 283, as shown in FIG. 9B, measures the width (thickness) dimension of each area of the stem portion 12b side from the center of gravity of the found image 12' of the specific shallot 12, and specifies the area where the width is less than or equal to a predetermined value (the area indicated by reference numeral 37 in the example shown in FIG. 9B). Similarly, the second image processing portion 283 measures the width (thickness) dimension of each area of the root hair portion 12b side from the center of gravity of the found image 12' of the specific shallot 12, and specifies the area where the width is less than or equal to a predetermined value (the area indicated by reference numeral 38 in the example shown in FIG. 9B). Then, the second image processing portion 283 sets the specified areas 37 and 38 as the processing target area of the specific shallot 12.

Figure 10:
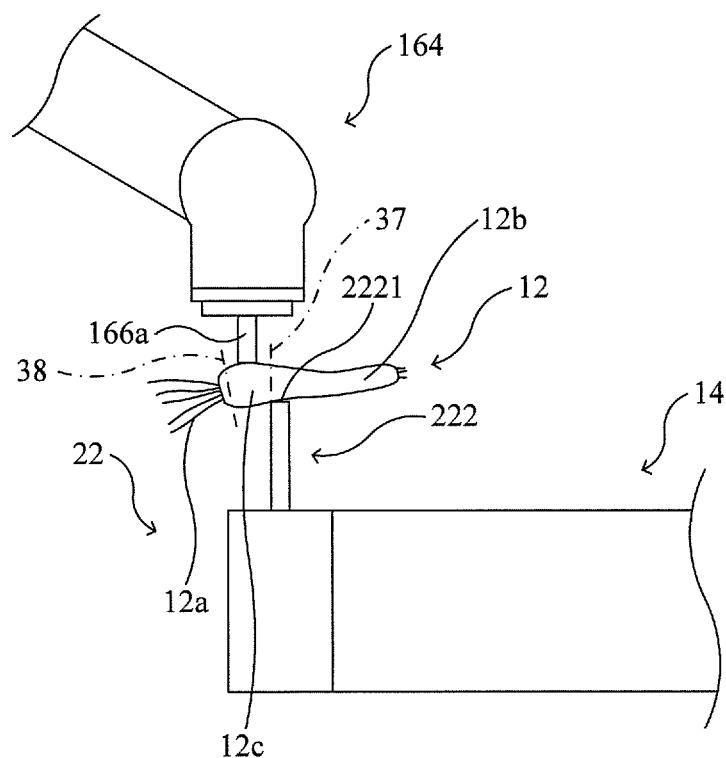
FIG. 10 is an explanatory drawing explaining an example of the operation of the robot system.

Subsequently, as shown in FIG. 10, the robot 16A operates the swing base 163 and the arm 164 in coordination via the control of the second controller 2862 of the robot controller 286. With this arrangement, the set processing target area (the area 37 and the area 38 in the example shown in FIG. 10) of the specific shallot 12 lifted by the suction pad 166a is guided to the location of the blade 2221. Then, the specific shallot 12 lifted by the suction pad 166 is cut by the blade 2221 along the processing target area via the coordinated operation of the swing base 163 and the arm 164. With this arrangement, the root hair portion 12a and the stem portion 12b are separated from the bulb portion 12c, dropped, and put into the discard box 24 beneath the blade 2221. Subsequently, the robot 16A further operates the swing base 163 and the arm 164 in coordination via the control of the robot controller 286. As a result, the bulb portion 12c of the specific shallot 12 lifted by the suction pad 166 is moved above the adjacent input box 26. The vacuum suction of the suction pad 166 is then released in this moved state, causing the bulb portion 12c of the specific shallot 12 to be inputted into the input box 26. Note that while the above has described an illustrative scenario in which the robot 16A selected by the robot selecting portion 285 suctions and cuts the specific shallot 12, a similar operation may be performed by another of the robots 16, such as the robot 16B.

As described above, in the robot system 10 of this embodiment, the robot 16 makes the suction pad 166 contact the shallot 12 transported within the movable range of the suction pad 166 by the conveyor 14, and lifts the shallot 12. Further, the lifted shallot 12 moves to the location of the blade 2221 of the circular cutter 222 of the cutter 22, where the cutting process is performed on the shallot 12.

Here, the shallot 12, which is an inconsistent object as described above, displays variance in its individual shape. As a result, when the shallot 12 is cut following the usual method, the robot 16 sometimes cannot make the suction pad 166 contact the shallot 12 and thus fails to lift the shallot 12 when attempting to move the transported shallot 12 to the location of the blade 2221. Or, the suction pad 166 may contact the shallot 12 but, due to a poor contact position, fails to lift the shallot 12. Or, sometimes the suction pad 166 lifts the shallot 12, but then drops it while in motion. In such cases, the possibility exists that the robot 16 will fail to move the shallot 12 to the location of the blade 2221. Further, even if the shallot 12 is successfully moved to the location of the blade 2221, the variance in individual shape of the shallot 12 described above makes it impossible to set in detail the processing target area of each of the shallots 12 when following the usual methods. As a result, the possibility exists that variance will occur in the individual cutting area of the shallot 12 during processing.

Here, in this embodiment, the three-dimensional sensor 18 detects the shallot 12 transported on the transport path by the conveyor 14. Then, the first image processing portion 281 of the controller 28 sets the suction target area of the specific shallot 12 that passed under the three-dimensional sensor 18, based on the detection result of the three-dimensional sensor 18. Subsequently, when the specific shallot 12 is transported within the movable range of the suction pad 166, the robot 16 makes the suction pad 166 contact the set suction target area of the specific shallot 12 via the control of the first controller 2861 of the controller 28. With this arrangement, the specific shallot 12 is lifted and moved to the image capturing location. As a result, even in a case where the shallot 12 is to be cut, the robot 16 can reliably move the shallot 12 to the location of the blade 2221. Then, the camera 20 detects the posture of the specific shallot 12 moved to the image capturing location. Based on the detection results of the camera 20, the second image processing portion 283 of the controller 28 sets the processing target area of the specific shallot 12 lifted by the suction pad 166 of the robot 16. Subsequently, the robot 16 guides the set processing target area of the specific shallot 12 lifted by the suction pad 166 to the location of the blade 2221 via the control of the second controller 2862 of the controller 28. With this arrangement, in a case where the shallot 12 is to be cut, the processing target area of the shallot 12 can be guided to the location of the blade 2221. Accordingly, the variance in the processing area between the individual shallots 12 during processing can be suppressed, making it possible to improve processing accuracy.

Further, in this embodiment, after the three-dimensional sensor 18 detects the shallot 12, the camera 20 detects the posture of the shallot 12 once again, as described above. With this arrangement, even if the posture of the shallot 12 changes during transport after detection by the three-dimensional sensor 18, the camera 20 verifies the posture of the shallot 12 once again, making it possible to process the shallot 12. With this as well, the advantage of improvement of processing accuracy is achieved.

Further, in particular, according to this embodiment, the conveyor 14 comprises the motor 142, the conveyor drive portion 144 rotationally driven by the motor 142, and the encoder 146 that is connected to the conveyor drive portion 144 and detects the rotational position of the conveyor drive portion 144. Then, the first control portion 2861 of the robot controller 286 of the controller 28 calculates the operation start timing of the robot 16 based on the detection result of the encoder 146. As a result, the robot 16 is capable of reliably lifting the shallot 12 in reliable coordination with the transport operation of the shallot 12 by the conveyor 14.

Further, in particular, according to this embodiment, the following advantages can be achieved. That is, it is possible to consider a configuration in which the camera is installed on the upstream side of the transport path of the conveyor 14 and determine the shape (two-dimensional shape) of the shallot 12 based on the image captured by that camera. Nevertheless, in such a case, for example, the members constituting the transport surface of the conveyor 14 are made of an optically transparent material, requiring the optical conditions of the area around the camera to be strictly controlled in order to achieve a detailed image of the shallot 12. This can be achieved by, for example, radiating a backlight from the lower side of the transport surface toward the shallot 12. As a result, an increase in equipment costs is incurred. Here, in this embodiment, the three-dimensional camera 18 is installed on the upstream side of the transport path of the conveyor 14. Then, the first image processing portion 281 of the controller 28 sets the contact target area of the shallot 12 based on the range image corresponding to the detection result of the three-dimensional camera 18. With the shape (three-dimensional shape) of the shallot 12 determined based on the range image corresponding to the detection result of the three-dimensional sensor 18, the optical conditions around the three-dimensional sensor 18 do not need to be as strictly controlled as in the case where the camera is installed. Accordingly, a reduction in equipment costs can be achieved. Further, since the contact target area of the shallot 12 is set based on the three-dimensional shape of the shallot 12, it is possible to determine the area where the robot 16 can achieve reliable contact by the suction pad 166 (the highest area comprising a flat surface area of a predetermined surface area or greater of the shallot 12 in this example). As a result, a further increase in the setting accuracy of the contact target area of the shallot 12 can be achieved.

Further, in particular, according to this embodiment, the following advantages can be achieved. That is, as described above, according to the embodiment, the shallot 12 is reliably moved to a predetermined location. Accordingly, it is possible to use a sensor that requires strict control of optical conditions (such as the installation of backlights in the surrounding area) within the movable range of the suction pad 166 of the robot 16 as the sensor for detecting the posture of the moved shallot 12. That is, it is possible to capture a detailed image of the shallot 12 even if the sensor is configured within a camera. Here, in this embodiment, the sensor for detecting the posture of the shallot 12 moved to the predetermined location is configured within the camera 20, and the second image processing portion 283 of the controller 28 sets the processing target area of the shallot 12 based on the image captured by that camera 20. With this arrangement, the sensor for detecting the posture of the shallot 12 moved to the predetermined location does not require configuration using an expensive three-dimensional sensor. That is, the posture, center of gravity, etc., of the shallot 12 are found based on the image captured by the camera 20, making it possible to determine the area of the shallot 12 to be processed. Then, it is possible to set the processing target area of the shallot 12 with high accuracy.

Further, in particular, according to this embodiment, the robot 16 comprises the suction pad 166 capable of lifting by suction the shallot 12, at the end of the arm 164. Then, the first image processing portion 281 of the controller 28 sets the suction target area of the vacuum suction of the suction pad 166. With this arrangement, the transported shallot 12 can be quickly and reliably lifted by the vacuum suction force of the suction pad 166.

Further, in particular, according to the embodiment, the system comprises the cutter 22 comprising the blade 2221 for cutting the shallot 12. Then, the second controller 2862 of the robot controller 286 of the controller 28 controls the robot 16 so that the processing target area of the shallot 12 lifted by the suction pad 166 of the robot 16 is guided to the location of the blade 2221. With this arrangement, the processing target area of the shallot 12 lifted by the suction pad 166 of the robot 16 is reliably guided to the location of the blade 2221 of the cutter 22. As a result, the cutting of the shallot 12 can be achieved with high accuracy.

Note that the embodiments are not limited to the above, and various modifications may be made without deviating from the spirit and scope of the disclosure. The following describes such modifications.

(1-1) Variations of Camera Arrangement

Figure 11:
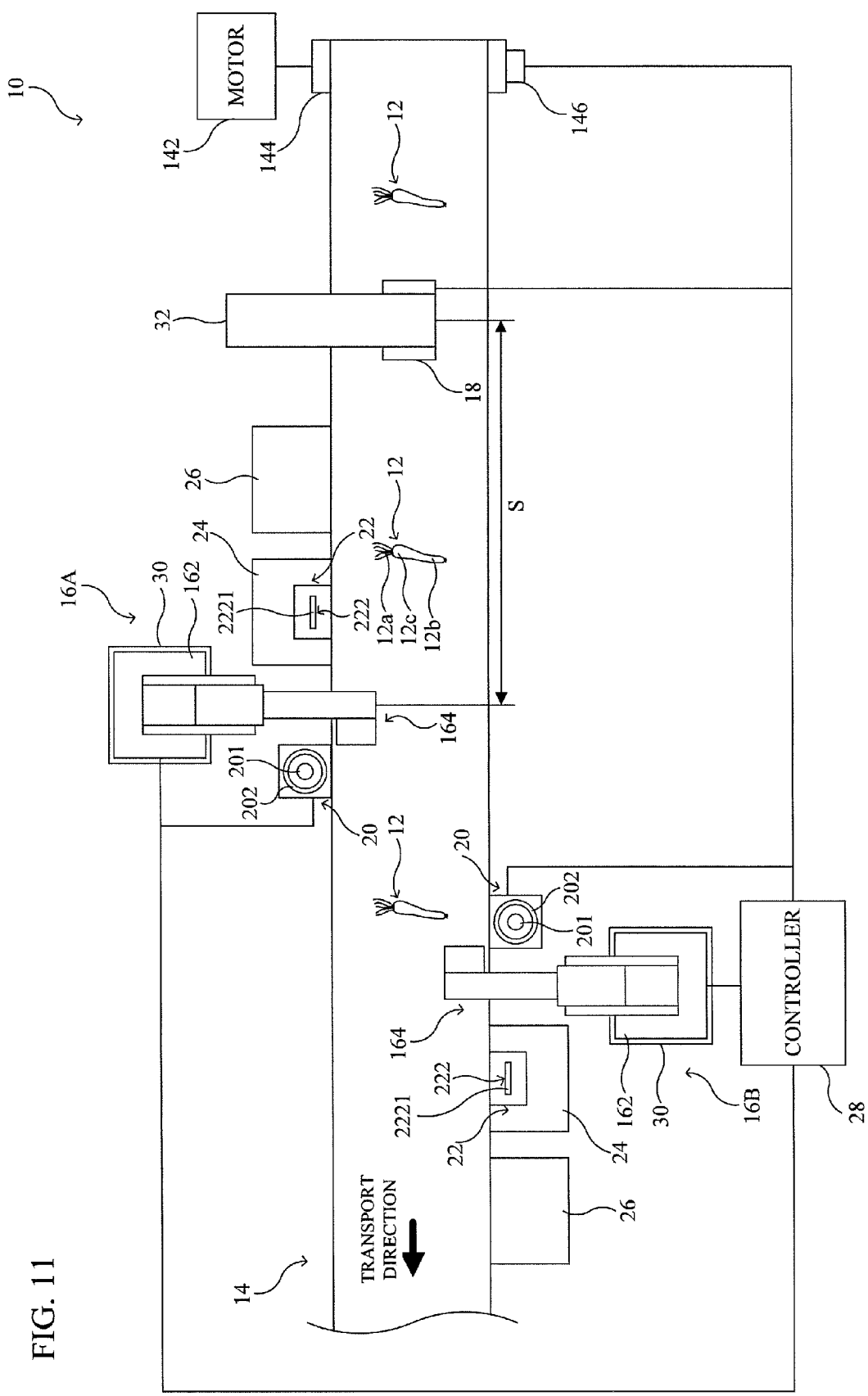
FIG. 11 is a top view schematically showing the overall configuration of the robot system of a modification wherein the camera is installed with its front side facing upward.

For example, as shown in FIG. 11, each of the cameras 20 may be disposed so that the front side (the side comprising the lens 201 and the lighting 202) is facing upward. According to this modification as well, similar to the embodiment, the variance in processing areas between the individual shallots 12 during processing can be reliably suppressed, making it possible to improve processing accuracy. Further, with the camera 20 installed with its front side facing upward, the robot 16 can quickly move the shallot 12 to the image capturing location within the field of view of the lens 201. This makes it possible to shorten the cycle time of the robot 16.

(1-2) Other

While, according to the above, the controller 28 comprises the first image processing portion 281, the second image processing portion 283, and the robot controller 286 comprising the first controller 2861 and the second controller 2862, and performs various operations and processes in batch form, the present disclosure is not limited thereto. That is, these various operations and processes may be separately performed by devices separate from the controller 28. For example, a first image processing device, a second image processing device, and a robot controller may be provided. Then, the first image processing device performs the same operations and processes as the first image processing portion 281, the second image processing device performs the same operations and processes as the second image processing portion 283, and the robot controller performs the same operations and processes as the robot controller 286. In such a case, the first image processing device is equivalent to the first setting portion, the second image processing device is equivalent to the second setting portion, and the robot controller is equivalent to the first control portion and the second control portion described in the claims.

Further, while, according to the above, the three-dimensional sensor 18 is installed as the sensor for detecting the shallot 12 transported on the transport path by the conveyor 14, the present disclosure is not limited thereto. That is, the sensor installed may be a camera, a range sensor, or the like. In such a case, the camera, range sensor, etc., is equivalent to the first sensor described in the claims.

Further, while according to the above the shallot 12, which is an inconsistent object, is subjected to a cutting process, the present disclosure is not limited thereto. That is, an inconsistent object such as a natural object such as a vegetable or fruit other than the shallot 12 or an artificial object (industrial product) having a mixed plurality of types may be subjected to processing. In such a case, the inconsistent object such as the natural object such as a vegetable or fruit other than the shallot 12, or the artificial object having a mixed plurality of types, is equivalent to the object described in the claims. Further, the object is not limited to an object with an inconsistent shape, allowing objects of a regular shape as well. In such a case, the regular shaped object is equivalent to the object described in the claims.

Further, while according to the above the shallot 12 is subjected to a cutting process, the present disclosure is not limited thereto, allowing the shallot 12 to be subjected to a process other than a cutting process.

Further, while according to the above the robot 16 comprises the suction pad 166 at the end of the arm 164, the present disclosure is not limited thereto. That is, the robot 16 may comprise a robot hand at the end of the arm 164, capable of lifting by clamping the shallot 12. In such a case, the robot hand is equivalent to the tool described in the claims. Further, the robot 16 may comprise a barbed member capable of lifting the shallot 12 by piercing, at the end of the arm 164. In such a case, the barbed member is equivalent to the tool described in the claims. Further, in a case where an object made of a magnetic substance, such as iron, is subjected to processing, the robot 16 may comprise an electromagnet capable of electromagnetically lifting by electromagnetic force the object made of the magnetic substance, such as iron, at the end of the arm 164. In such a case, the electromagnet is equivalent to the suctioning member and the tool described in the claims.

Further, while according to the above the robot 16 is installed in plurality, the present disclosure is not limited thereto, allowing installation of just one robot 16.

Next, second embodiment will be described with reference to accompanying drawings. The components that are the same as those in embodiment 1 will be denoted using the same reference numerals, and descriptions thereof will be suitably omitted or simplified. This embodiment, similar to embodiment 1, is an embodiment of a cutting system that employs a shallot as the target object.

The robot system 10 (robot system) of this embodiment comprises the same configuration as the robot system of first embodiment shown in FIG. 1 and FIG. 2.

In this embodiment, of the robots 16A and 16B, the function of the upstream robot 16A is the same as that in first embodiment. That is, the suction pad 166a is installed at the end of the arm 164 of the robot 16A. Then, the robot 16A operates the swing base 163 and the arm 164 in coordination so that the suction pad 166a contacts the shallot 12 transported on the transport path. Then, the shallot 12 lifted by the vacuum suction of the suction pad 166a moves to the predetermined image capturing location of the camera 20. Then, after the shallot 12 lifted by the suction pad 166a is moved to the location of the blade 2221 of the cutter 22 and cut, the bulb portion 12c of the shallot 12 from which the root hair portion 12a and the stem portion 12b were cut off are inputted into the input box 26.

Figure 12:
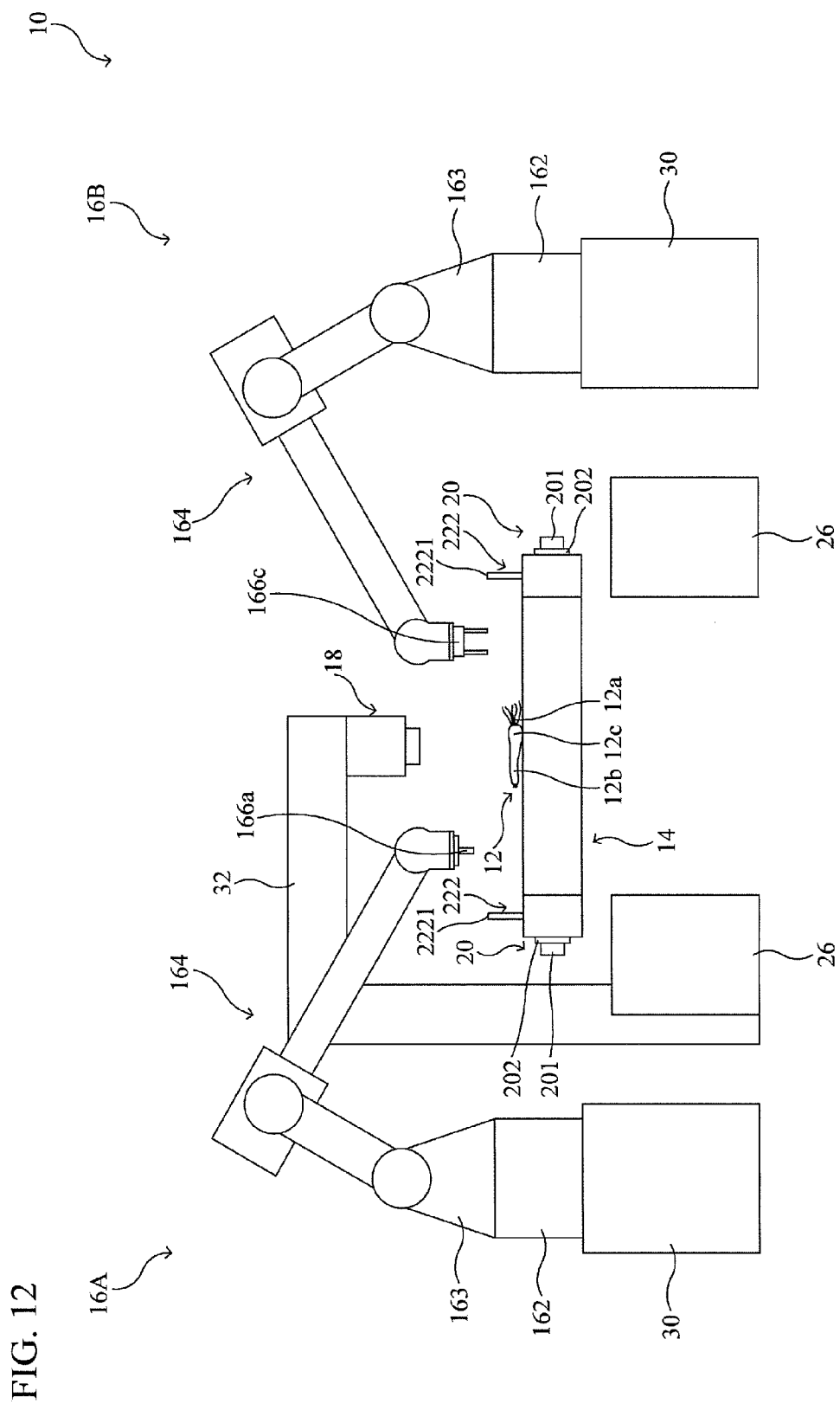
FIG. 12 is a side view schematically showing the overall configuration of the robot system of embodiment 2.

On the other hand, according to this embodiment, the robot 16B on the downstream side of the transport path has a hand 166c (robot hand) installed as the tool at the end of the arm 164, as shown in FIG. 12. The hand 166c is a tool capable of lifting the shallot 12 by using clamping as the predetermined lifting method. This robot 16B operates the swing base 163 and the arm 164 in coordination, making the hand 166c contact the bulb portion 12c of the transported shallot 12. The shallot 12 is lifted by the clamping of the hand 166c and then, similar to the robot 16A, moved to the predetermined image capturing location within the field of view of the lens 201 of the camera 20. Then, the shallot 12 lifted by the hand 166c is moved to the location of the blade 2221 of the circular cutter 222 of the cutter 22 and is cut by the cutter 22, similar to the robot 16A. Subsequently, the bulb portion 12c of the shallot 12, from which the root hair portion 12a and the stem portion 12b were cut off by the cutting process, and which was lifted by the hand 166c, is moved above the input box 26 and inputted into the input box 26.

Note that, in this embodiment, the tact time when the shallot 12 is lifted by the vacuum suction of the suction pad 166a is shorter than the tact time when the shallot 12 is lifted by the clamping of the hand 166c. That is, the vacuum suction of the suction pad 166a is capable of lifting the shallot 12 faster than the clamping of the hand 166c.

The controller 28, similar to first embodiment, comprises a computer comprising an input device, display device, storage device, operational device, and the like, for controlling the operation of the three-dimensional camera 18, each of the robots 16A and 16B, the camera 20, and the like. Then, according to this embodiment, the storage device of the controller 28 stores a plurality of operation commands inputted in advance via a teach pendant or the like, for example. This plurality of operation commands includes operation commands in which the robot 16 and the tool type are not specified (such as teaching data including the position of each control point, the angle of each joint, and the type of interpolation operation, for example) for the task of lifting and moving the shallot 12 transported on the transport path by the tool.

Next, an example of the control contents executed by the controller 28 of this embodiment will be described using FIG. 13.

Figure 13:
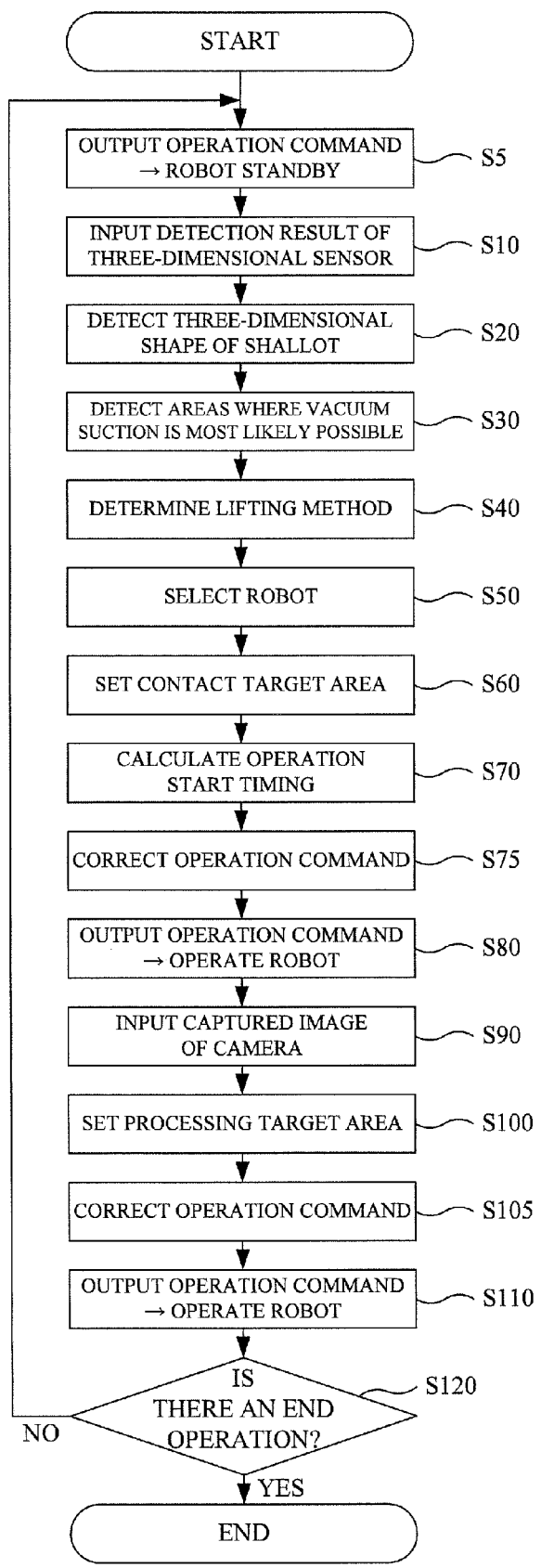
FIG. 13 is a flowchart showing an example of the control details executed by the controller.

In FIG. 13, the process shown in the flow is started by a predetermined start operation (power ON by the controller 28, for example) performed via an input device, for example. First, in step S5, the controller 28 outputs a predetermined operation command stored in a storage device to each of the robots 16A and 16B so that each of the robots 16A and 16B assume a predetermined standby posture (the posture indicated in FIG. 12, for example). Each of the robots 16A and 16B operates the swing base 163 and the arm 164 in coordination, assumes a predetermined standby posture, and waits, based on the operation command from the controller 28.

Then, the flow proceeds to step S10 where the controller 28 inputs the detection result of the three-dimensional sensor 18, that is, the image captured by the camera 20 of the three-dimensional sensor 18 and the distance information of that captured image.

Subsequently, in step S20, the controller 28 generates a range image (three-dimensional information) that expresses in an image the size of the distance from each area in the image to the three-dimensional sensor 18, based on the captured image and the distance information inputted in the step S10. Then, the controller 28 detects the three-dimensional shape of the specific shallot 12 that passed under the three-dimensional sensor 18, based on the generated range image.

Then, the flow proceeds to step S30 where the controller 28 detects an area that can most likely be vacuum suctioned by the suction pad 166a of the specific shallot 12, based on the three-dimensional shape of the specific shallot 12 detected in the step S20 (details described later).

Subsequently, in step S40, the controller 28 determines the lifting method of the processing mode of the lifting process of the tool of the robot 16 for the specific shallot 12, in accordance with the detection result of the step S30. For example, in the step S30, in a case where an area exists on the specific shallot 12 that can most likely be vacuum suctioned, the controller 28 determines that the lifting method for the specific shallot 12 will be vacuum suctioning by the suction pad 166a. This is because the tact time for vacuum suctioning by the suction pad 166a is shorter than that for clamping by the hand 166c. On the other hand, in the step S30, in a case where an area does not exist on the specific shallot 12 that can most likely be vacuum suctioned, the controller 28 determines that the lifting method for the specific shallot 12 will be clamping by the hand 166c. That is, in a case where an area exists on the specific shallot 12 that can most likely be vacuum suctioned, the lifting method is determined to be vacuum suctioning, which has a shorter tact time, and in a case where an area does not exist on the specific shallot 12 that can most likely be vacuum suctioned, the lifting method is determined to be clamping, which has a longer tact time. The procedure of this step S40 functions as the mode determining portion described in the claims.

Then, the flow proceeds to step S50 where the controller 28 selects from the robot 16A and the robot 16B the robot 16 (equivalent to the first robot; hereinafter suitably the "specific robot 16") to which the tool (equivalent to the first tool; hereinafter suitable the "specific tool") corresponding to the lifting method determined in the step S40 is installed, as the robot 16 to perform the task on the specific shallot 12. For example, in the step S40, in a case where the lifting method is determined to be vacuum suction, the robot 16A comprising the suction pad 166a, which serves as a tool that performs vacuum suctioning, is selected. On the other hand, in the step S40, in a case where the lifting method is determined to be clamping, the robot 16B comprising the hand 166c, which serves as a tool that performs clamping, is selected. The procedure of this step S50 functions as the first robot selecting portion described in the claims.

Subsequently, in step S60, the controller 28 sets the contact target area of the specific shallot 12 in accordance with the selection result in the step S50. The contact target area is an area that serves as the target for contact by the specific tool of the specific robot 16. For example, in a case where the robot 16A is selected in the step S50, the area of the specific shallot 12 detected in the step S30 that is most likely capable of being vacuum suctioned and that satisfies predetermined conditions (details described later) is set as the suction target area of the above contact target area of the specific shallot 12. The suction target area is an area that serves as the target of vacuum suctioning by the suction pad 166a. On the other hand, in a case where the robot 16B is selected in the step S50, the suitable area of the bulb portion 12c of the specific shallot 12 is set as the clamping target area of the contact target area of the specific shallot 12. The clamping target area is the area that serves as the target for clamping by the hand 166c.

Then, the flow proceeds to step S70 where the controller 28 calculates the movement amount of the shallot 12 transported on the transport path, based on the detection result (that is, the rotational position information of the conveyor drive portion 144) of the encoder 146 inputted at suitable timing from the encoder 146 of the conveyor 14. Then, based on that calculated movement amount of the shallot 12, the controller 28 calculates the timing at which the specific shallot 12 will be transported within the movable range of the specific tool of the specific robot 16. This timing, in other words, is the operation start timing of the specific robot 16 for lifting the specific shallot 12 transported on the transport path using the specific tool. The procedure of this step S70 functions as the timing calculating portion.

Subsequently, in step S75, the controller 28 reads the operation command related to the step S75 stored in the storage device, and corrects the read operation command for the specific tool of the specific robot 16. That is, when the operation start timing calculated in the step S70 arrives, the operation command is corrected so that the swing base 163 and the arm 164 operate in coordination. Further, the operation command is corrected so that the specific tool contacts the contact target area of the specific shallot 12 transported on the transport path, and lifts and moves the specific shallot 12 to the image capturing location related to the adjacent camera 20. As a result, for example, in a case where the robot 16A is selected in the step S50, the operation command is corrected for the suction pad 166a of the robot 16A. That is, the operation command is corrected so that the suction pad 166a contacts the suction target area of the specific shallot 12, and the specific shallot 12 is lifted and moved to the image capturing location by the vacuum suction of the suction pad 166a. On the other hand, in a case where the robot 16B is selected in the step S50, the operation command is corrected for the hand 166c of the robot 16B. That is, the operation command is corrected so that the hand 166c contacts the clamping target area of the specific shallot 12, and the specific shallot 12 is lifted and moved to the image capturing location by the clamping of the hand 166c.

Subsequently, in step S80, the controller 28 outputs the operation command after correction in the step S75 to the specific robot 16. With this arrangement, the specific robot 16 operates the swing base 163 and the arm 164 in coordination when the operation start timing arrives, based on the operation command from the controller 28. As a result, the specific tool contacts the contact target area of the specific shallot 12 transported on the transport path, and lifts and moves the specific shallot 12 to the image capturing location related to the adjacent camera 20 (details described later). For example, in a case where the robot 16A is selected in the step S50, the suction pad 166a of the robot 16A contacts the suction target area of the specific shallot 12, and the specific shallot 12 is lifted and moved to the image capturing location by the vacuum suction of the suction pad 166a. On the other hand, in a case where the robot 16B is selected in the step S50, the hand 166c of the robot 16B contacts the clamping target area of the specific shallot 12, and the specific shallot 12 is lifted and moved to the image capturing location by the clamping of the hand 166c.

Then, the flow proceeds to step S90 where the controller 28 inputs the detection result of the camera 20 located adjacent to the specific robot 16, that is, the captured image of the camera 20.

Subsequently, in step S100, the controller 28 detects the shape and posture of the specific shallot 12 captured by the camera 20 based on the captured image of the camera 20 inputted in the step S90, and sets the processing target area of the specific shallot 12 (details described later). The processing target area, similar to first embodiment, is an area that serves as the target of the overall cutting section, including the cutting start position of the blade 2221 of the circular cutter 222 of the cutter 22 and the cutting angle from that cutting start position.

Then, the flow proceeds to step S105 where the controller 28 reads the operation command related to the step S105 stored in the storage device, and corrects the operation command thus read. That is, the read operation command is corrected for the specific tool of the specific robot 16 so that the processing target area of the specific shallot 12 lifted by the specific tool is guided to the location of the blade 2221. For example, in a case where the robot 16A is selected in the step S50, the operation command is corrected for the suction pad 166a so that the processing target area of the specific shallot 12 lifted by the suction pad 166a is guided to the location of the blade 2221. On the other hand, in a case where the robot 16B is selected in the step S50, the operation command is corrected for the hand 166c so that the processing target area of the specific shallot 12 lifted by the hand 166c is guided to the location of the blade 2221.

Then, the flow proceeds to step S110 where the controller 28 outputs the operation command after correction in the step S105 to the specific robot 16. With this arrangement, the specific robot 16 operates the swing base 163 and the arm 164 in coordination, based on the operation command from the controller 28. As a result, the processing target area of the specific shallot 12 lifted by the specific tool is guided to the location of the blade 2221 where a predetermined operation is performed (details described later). For example, in a case where the robot 16A is selected in the step S50, the processing target area of the specific shallot 12 lifted by the suction pad 166a of the robot 16A is guided to the location of the blade 2221 where a predetermined operation is performed. On the other hand, in a case where the robot 16B is selected in the step S50, the processing target area of the specific shallot 12 lifted by the hand 166c of the robot 16B is guided to the location of the blade 2221 where a predetermined operation is performed.

Subsequently, in step S120, the controller 28 determines whether or not the predetermined end operation (for example, power off of the controller 28) was performed via the input device, for example. Until the predetermined end operation is performed, the conditions of step S120 are not satisfied, the flow returns to the step S5, and the same procedure is repeated. Once the predetermined end operation is performed, the conditions of step S120 are satisfied and the processing indicated in this flow ends.

Note that, in the above, the procedures of step S75 and step S105 function as the operation correcting portion and the means which corrects the operation command based on a detection result by the first detecting means described in the claims. Further, the procedures of step S80 and step S110 function as the command outputting portion and the means which generates an operation command to the robot.

Next, an example of the operation of the robot system 10 of this embodiment will be described using FIG. 4 to FIG. 10.

First, the controller 28 outputs a predetermined operation command stored in the storage device to each of the robots 16A and 16B. As a result, each of the robots 16A and 16B operate the swing base 163 and the arm 164 in coordination, assume a predetermined standby posture, and wait (refer to step S5). Then, as shown in FIG. 4, the shallot 12 continuously transported on the upstream side of the transport path at a predetermined rate is detected by the three-dimensional sensor 18 when it passes under the three-dimensional sensor 18. Then, that detection result, that is, the captured image of the camera of the three-dimensional sensor 18 and the distance information of that captured image, is outputted to the controller 28. With this arrangement, the captured image of the camera of the three-dimensional sensor 18 and the distance information of that captured image are inputted to the controller 28 (refer to step S10), and the range image is generated based on the inputted captured image of the camera of the three-dimensional sensor 18 and the distance information of that captured image (refer to FIG. 5A and FIG. 5B). As described using FIG. 5A and FIG. 5B, the shape of the specific shallot 12 that passed under the three-dimensional sensor 18 is expressed in three dimensions in the range image generated at this time, and the three-dimensional shape of the specific shallot 12 is detected based on this range image (refer to step S20). Then, based on the detected three-dimensional shape of the specific shallot 12, the area of the specific shallot 12 that can most likely be vacuum suctioned is detected (refer to step S30). In this embodiment as well, similar to first embodiment, descriptions are based under the premise that an obstacle that hinders the vacuum suctioning by the suction pad 166 does not exist above the bulb portion 12c of the specific shallot 12 shown in the generated range image. In this embodiment as well, similar to the above embodiment, an area comprising a flat surface area of a predetermined size (1 $cm^3$, for example) or greater is detected as the area that can most likely be vacuum suctioned.

Subsequently, in accordance with the detection result, the controller 28 determines the lifting method of the tool of the robot 16 for the specific shallot 12 (refer to step S40). The following describes an example of a case where an area of the specific shallot 12 most likely capable of being vacuum-suction is detected in the above. That is, in a case where an area of the specific shallot 12 that can most likely be vacuum suctioned is detected in the above, the lifting method for the specific shallot 12 is determined to be vacuum suctioning. Then, of the robots 16A and 16B, the robot 16A comprising the suction pad 166a serving as the tool that supports vacuum suctioning is selected (refer to step S50). Subsequently, the area of the specific shallot 12 that can most likely be vacuum suctioned and that exists in the highest location (the area 31 shown in FIG. 5A and FIG. 5B) is detected, and that detected area is set as the suction target area of the specific shallot 12

(refer to step S60). Then, similar to first embodiment, the movement amount of the shallot 12 transported on the transport path is calculated based on the detection result (that is, the rotational position information of the conveyor drive portion 144) of the encoder 146 inputted to the controller 28 at suitable timing from the encoder 146 of the conveyor 14. Then, based on the calculated movement amount of the shallot 12, the timing at which the specific shallot 12 is to be transported within the movable range of the suction pad 166a of the robot 16A (in other words, the operation start timing for lifting the specific shallot 12 by the suction pad 166a) is calculated (refer to step S70).

Then, the controller 28 reads and corrects the operation command stored in the storage device for the suction pad 166a of the robot 16A (refer to step S75). Subsequently, the corrected operation command is outputted from the controller 28 to the robot 16A. As a result, as shown in FIG. 6, the robot 16A operates the swing base 163 and the arm 164 in coordination when the calculated operation start timing arrives. With this arrangement, the suction pad 166a contacts the set suction target area (the area 31 in the example shown in FIG. 6) of the specific shallot 12 transported on the transport path. Then, as shown in FIG. 7, the specific shallot 12 is lifted by the vacuum suctioning of the suction pad 166. Then, the controller 28 moves the shallot 12 lifted by the suction pad 166 to the image capturing location within the field of view of the lens 201 of the camera 20 by operating in coordination the swing base 163 and the arm 164 so that a preset, predetermined image capturing position is assumed (refer to step S80).

With this, the camera 20 captures an image of the robot 16A in the image capturing position and the specific shallot 12 moved to the image capturing location within the field of view of the lens 201. Then, that captured image is outputted to the controller 28. With this arrangement, the captured image of the camera 20 (refer to FIG. 8A) is inputted to the controller 28 (refer to step S90). Based on the captured image in which the robot 16A and the shape and posture of the specific shallot 12 are expressed in two dimensions as shown in FIG. 8A, the shape and posture of the specific shallot 12 is detected, and the processing target area of the specific shallot 12 is set by the controller 28 (refer to step S100). In this embodiment, similar to first embodiment, first an image that excludes the image 16A' of the robot 16A shown in FIG. 8A is generated, the maximum inscribed circle (the circle 33 shown in FIG. 8B) of the image 12' of the specific shallot 12 in that image is calculated, and the center position of that maximum inscribed circle is set as the center of gravity (the position 34 in FIG. 8B) of the image 12' of the specific shallot 12. Subsequently, similar to the above, the one side and the other side of the center of gravity of the image 12' of the specific shallot 12 are compared in terms of surface area and, as shown in FIG. 9, the side with the greater surface area is determined to be the root hair portion 12a side, and the side with the smaller surface area is determined to be the stem portion 12b side. Then, similar to the above, the area 37 and the area 38 are set as the processing target area of the specific shallot 12 based on the respective width dimensions of both sides of the center of gravity of the image 12' of the specific shallot 12.

Then, the operation command stored in the storage device is read and subsequently corrected for the suction pad 166a of the robot 16A by the controller 28 (refer to step S105). Subsequently, the corrected operation command is outputted from the controller 28 to the robot 16A. As a result, as shown in FIG. 10, the robot 16A operates the swing base 163 and the arm 164 in coordination. With this arrangement, the processing target area (the areas 37 and 38) of the specific shallot 12 lifted by the suction pad 166a is guided to the location of the blade 2221 of the circular cutter 222, and cutting is performed along the processing target area by the blade 2221. With this arrangement, the root hair portion 12a and the stem portion 12b are separated from the bulb portion 12c, dropped, and put into the discard box 24. Then, the bulb portion 12c of the specific shallot 12 lifted by the suction pad 166a is moved above the input box 26 and, with the release of the vacuum suction of the suction pad 166, inputted into the input box 26 (refer to step S110).

As described above, the robot system 10 of this embodiment comprises the conveyor 14 that transports the shallot 12, the robots 16A and 16B that comprise the suction pad 166a or the hand 166c, and the controller 28 that outputs an operation command to each of the robots 16A and 16B. Each of the robots 16A and 16B operates based on the operation command from the controller 28, and performs the task of lifting and moving the shallot 12 transported on the transport path using the suction pad 166a or the hand 166c.

Here, in a case where the task performed is lifting and moving the shallot 12 serving as the above-described inconsistent object, variance exists in the individual shape of the shallot 12, normally making it impossible to recognize the shape of each of the shallots 12. As a result, each of the robots 16A and 16B may possibly miss the shallot 12 even when operated based on the operation command from the controller 28. To resolve such inconveniences, generally an image of the shallot 12 transported on the transport path is captured by a camera, and the controller 28 corrects the operation command based on that captured image and outputs the corrected operation command to the robot 16 to be operated. As a result, the robot 16 operates based on the corrected operation command, making it possible to reduce the number of misses of the shallot 12, even when performing the task of lifting and moving the shallot 12 as described above. Nevertheless, when this process is based on an image captured by a camera, it is possible to verify the two-dimensional shape of the shallot 12, but difficult to accurately verify the three-dimensional shape of the shallot 12. As a result, in a case where the task of lifting and moving the shallot 12 is performed, the method of correcting the operation command based on the image captured by a camera cannot reliably prevent misses of the shallot 12 even when the robot operates based on a corrected operation command. Accordingly, the shallot 12 gets missed, resulting in decreased productivity. On the other hand, to reliably perform the task of lifting and moving the shallot 12, the method of lifting the shallot 12 over a longer period of time than normal is a possibility. Nevertheless, in such a case, tact time increases, resulting in decreased productivity, similar to the case described above.

Here, in this embodiment, the three-dimensional sensor 18 is provided to the upstream side of the transport path, and this three-dimensional sensor 18 detects the three-dimensional shape of the shallot 12 transported on the transport path. Subsequently, the controller 28 corrects the operation command based on the detection result of the three-dimensional sensor 18, and outputs a corrected operation command to the robot 16 to be operated. With this arrangement, the robot 16 into which the corrected operation command from the controller 28 was inputted operates based on the corrected operation command, making it possible to reliably and quickly lift the shallot 12 transported on the transport path via the suction pad 166a or the hand 166c.

As described above, according to this embodiment, even in a case where the task of lifting and moving the shallot 12 is performed, the tact time is not increased, making it possible to reliably prevent misses of the shallot 12. As a result, improvements in productivity are achieved.

Further, in particular, according to this embodiment, the three-dimensional sensor 18 comprises a laser light source disposed so that the laser slit light is radiated on a predetermined location of the transport surface of the conveyor 14, and a camera that captures an image of the radiated location of the laser slit light radiated by the laser light source and the surrounding area thereof. With the three-dimensional sensor 18 having such a structure, it is possible to reliably and accurately detect the three-dimensional shape of the shallot 12 transported on the transport path.

Further, in particular, according to this embodiment, the controller 28 determines the lifting method of the shallot 12 transported on the transport path based on the detection results of the three-dimensional sensor 18. With this arrangement, it is possible to determine the lifting method that will permit reliable and quick lifting of the shallot 12. Then, the controller 28 corrects the operation command so that the shallot 12 transported on the transport path is lifted and moved by the suction pad 166a or the hand 166c in accordance with the determined lifting method. With this arrangement, it is possible to lift and move the shallot 12 using a lifting method that will permit reliable and quick lifting of the shallot 12. As a result, when the task of lifting and moving the shallot 12 is to be performed, it is possible to reliably prevent misses of the shallot 12 without increasing tack time and achieve improved productivity.

Further, in particular, according to this embodiment, the following advantages can be achieved. That is, the process for acquiring the range image from the detection result of the three-dimensional sensor 18 comprises a high volume of operations, requiring a relatively long processing time. Here, in this embodiment, of the robots 16A and 16B, the area in which the lifting process is performed by the suction pad 166a of the robot 16A installed on the most upstream side of the transport path is separated from the detection area of the shallot 12 of the three-dimensional sensor 18 by the predetermined distance S or longer along the transport path, on the downstream side of the transport path. Then, the predetermined distance S is set longer than the distance that the shallot 12 is transported over the processing time for acquiring the range image from the detection result of the three-dimensional sensor 18. As a result, the range image processing can be completed and the range image can be acquired before the shallot 12 reaches the area where the lifting process is to be performed by the suction pad 166a of the robot 16A. As a result, upon confirmation of the three-dimensional shape of the suction pad 166a based on the acquired range image, the lifting process via the suction pad 166a can be performed. Accordingly, it is possible to reliably prevent misses by the suction pad 166a. Further, with the suction pad 166a transported during the process for acquiring the range image from the detection result of the three-dimensional sensor 18, the processing time for that process can be effectively used without waste.

Further, in particular, according to this embodiment, the conveyor 14 comprises the motor 142, the conveyor drive portion 144 rotationally driven by the motor 142, and the encoder 146 that is connected to the conveyor drive portion 144 and detects the rotational position of the conveyor drive portion 144. Then, the controller 28 calculates the operation start timing of the robot 16 based on the detection result of the encoder 146. As a result, the tool of the robot 16 is capable of reliably lifting the shallot 12 transported on the transport path in reliable coordination with the transport operation of the shallot 12 by the conveyor 14.

Further, in particular, according to this embodiment, two of the robots 16 are installed, i.e., the robots 16A and 16B, each comprising plural kinds of tools practicing different lifting methods with each other. Then, the controller 28 determines the lifting method of the shallot 12 based on the range image corresponding to the detection result of the three-dimensional sensor 18. Then, the controller 28 selects from the robot 16A and the robot 16B the robot 16 that comprises the tool corresponding to the determined lifting method. Subsequently, the controller 28 corrects the operation command so that the tool corresponding to the determined lifting method of the selected robot 16 lifts and moves the shallot 12 transported on the transport path. With this arrangement, it is possible to selectively use from the robots 16A and 16B the robot 16 which comprises the tool corresponding to the lifting method cable of reliably and quickly lifting the shallot 12. As a result, misses of the shallot 12 can be reliably prevented, thereby reliably improving productivity.

Further, in particular, according to this embodiment, the suction pad 166a is installed to the arm 164 of the robot 16A, and the hand 166c is installed to the arm 164 of the robot 16B. With the suction pad 166a installed to the arm 164 of the robot 16A, it is possible to lift the shallot 12 by suction. As a result, the shallot 12 can be lifted without damage due to piercing, and the tact time can be abbreviated compared to a case where the shallot 12 is lifted by the clamping of the hand 166c. Further, with the hand 166c installed to the arm 164 of the robot 16B, it is possible to lift the shallot 12 by clamping. As a result, even in a case where it is difficult to lift the shallot 12 by the suction of the suction pad 166a, the shallot 12 can be reliably lifted. Note that a case where it is difficult to lift the shallot 12 by suction includes a case where the shape or material of the shallot 12 is not suited for suctioning, a case where an obstacle exists near the area where the shallot 12 can be most likely suctioned by the suction pad 166a, or the like.

Note that the embodiments are not limited to the above, and various modifications may be made without deviating from the spirit and scope of the disclosure. The following describes such modifications one by one.

(2-1) When the Standby Posture of the Robot is Determined and the Robot is Selected Accordingly While in second embodiment the lifting method of the shallot 12 is determined based on the range image corresponding to the detection result of the three-dimensional sensor 18 and the robot 16 is selected accordingly, the present disclosure is not limited thereto. That is, the controller 28 may determine the standby posture up to the start of the lifting process of the robot 16 based on the range image corresponding to the detection result of the three-dimensional sensor 18 and select the robot 16 accordingly.

Figure 14:
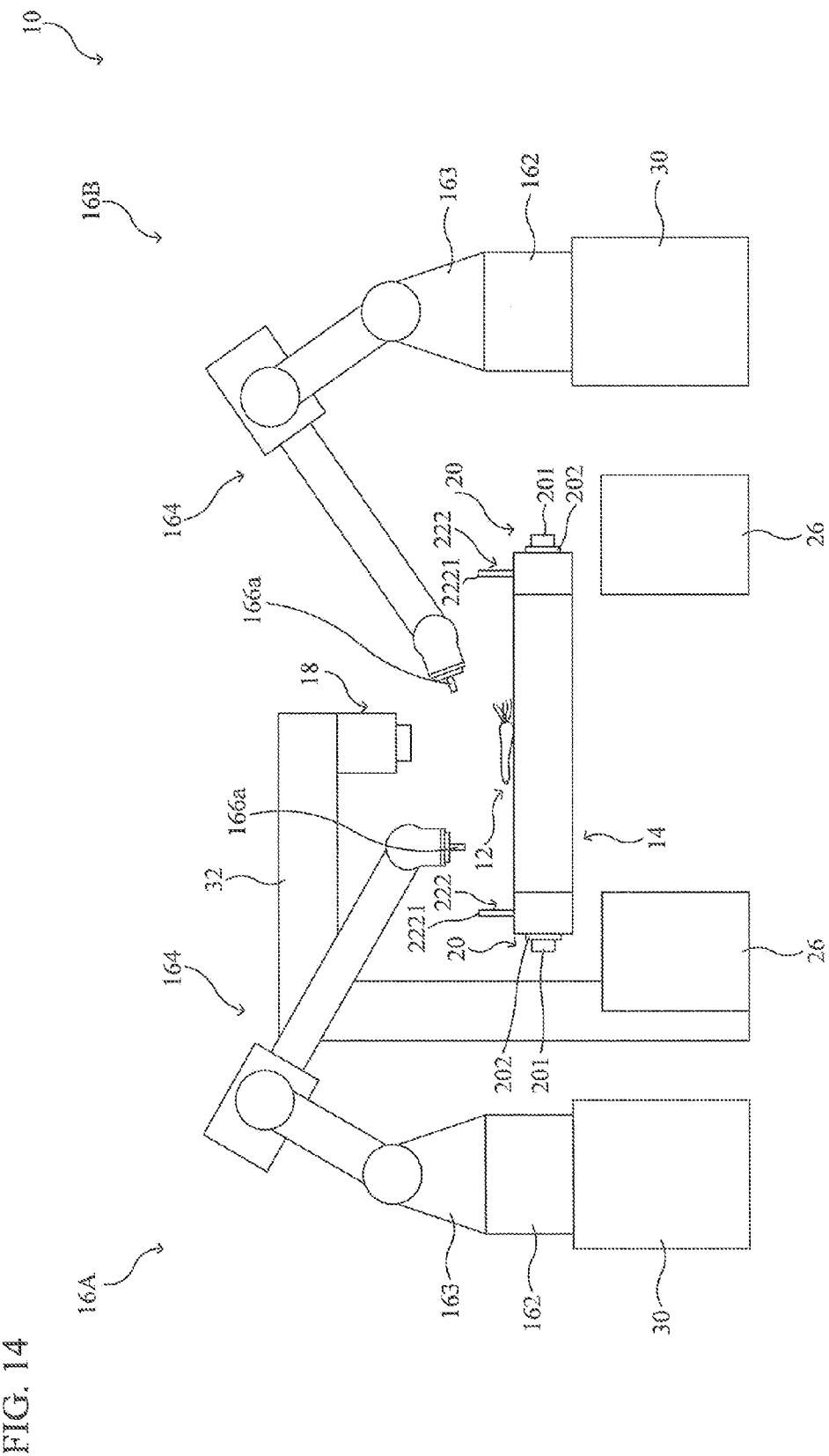
FIG. 14 is a side view schematically showing the overall configuration of the robot system of a modification wherein the robot standby posture is determined and the robot is selected accordingly.

As shown in FIG. 14, in this modification, the tool installed at the end of the arm 164 of the robot 16B and the control contents of the controller 28 (refer to FIG. 1) differ from those of second embodiment. That is, in this modification, the same suction pad 166a as that of the robot 16A is installed to the end of the arm 164 of the robot 16B.

Figure 15:
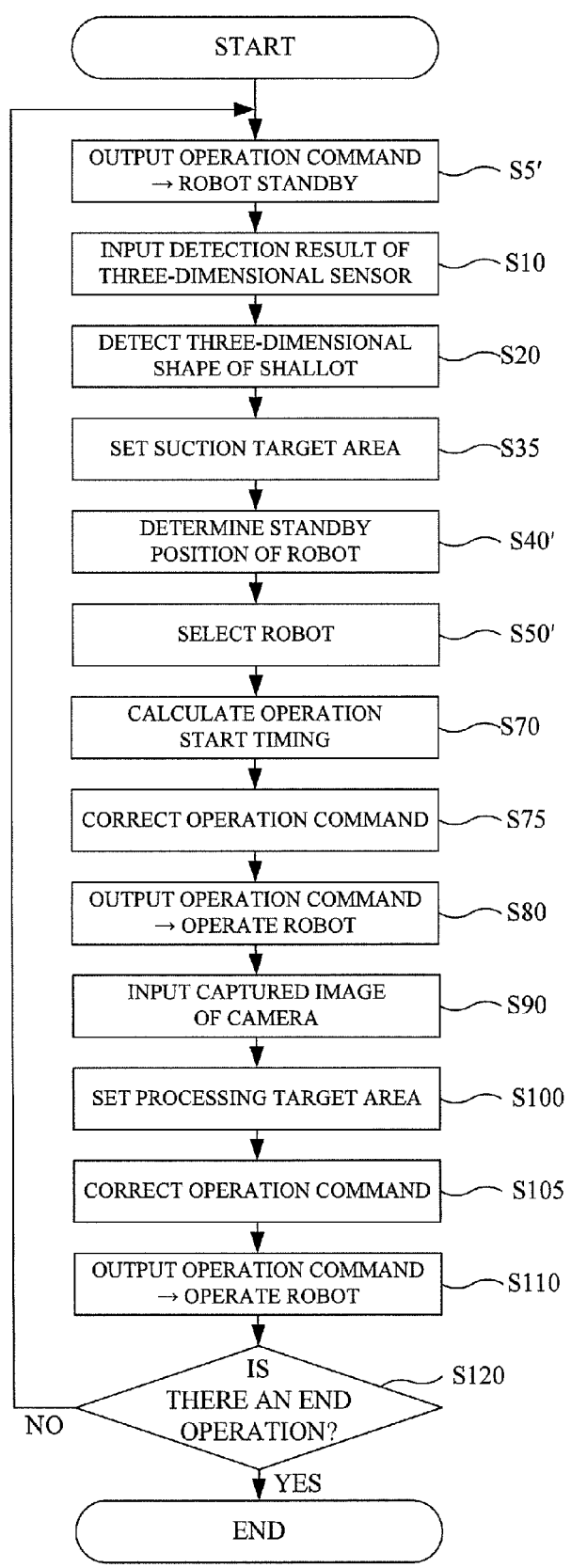
FIG. 15 is a flowchart showing an example of the control details executed by the controller.

The following describes an example of the control contents executed by the controller 28 of this modification using FIG. 15. Note that FIG. 15 is a figure that corresponds to the above FIG. 13, the same procedures as those in FIG. 13 are denoted using the same reference numerals, and descriptions thereof are suitably omitted or simplified.

In FIG. 15, first, in step S5', the controller 28 outputs a predetermined operation command stored in a storage device to each of the robots 16A and 16B so that each of the robots 16A and 16B assume a predetermined standby posture that differs from the other (the positions indicated in FIG. 14, for example). With this arrangement, each of the robots 16A and 16B operates the swing base 163 and the arm 164 in coordination, based on the operation command from the controller 28. As a result, each of the robots 16A and 16B waits in a predetermined standby posture that differs from the other.

The subsequent steps S10 and S20 are the same as those of FIG. 13, and the flow proceeds to step S35 once the three-dimensional shape of the specific shallot 12 is detected in step S20.

In step S35, the controller 28 detects an area of the specific shallot 12 that can most likely be vacuum suctioned by the suction pad 166a, based on the three-dimensional shape of the specific shallot 12 detected in the step S20. Then, of the detected areas of the shallot 12 that can most likely be vacuum suctioned, the area that satisfies predetermined conditions is set as the suction target area of the suction pad 166a of the specific shallot 12.

Subsequently, in step S40', the controller 28 determines the standby posture up to the start of the lifting process of the robot 16 as the process mode of the lifting process of the specific shallot 12 in accordance with the set position of the suction target area of the specific shallot 12. Specifically, the controller 28 determines which of the two different standby postures of the robots 16A and 16B in the step S5' is capable of reliably approaching the suction target area and takes a shorter amount of time to approach the suction target area, i.e., has a shorter tact time. Note that the procedure of this step S40' functions as the mode determining portion described in the claims.

Then, the flow proceeds to step S50' where the controller 28 selects from the robots 16A and 16B the robot 16 (equivalent to the second robot) waiting in the standby posture determined in the step S40' as the robot 16 to perform the task on the specific shallot 12. Note that the procedure of this step S50' functions as the second robot selecting portion described in the claims.

The procedures following step S70 are substantially the same as those in FIG. 13, and descriptions thereof will be omitted.

Note that, in the above, the procedures of step S75 and step S105 function as the operation correcting portion and the means which corrects the operation command based on a detection result by the first detecting means described in the claims. Further, the procedures of step S80 and step S110 function as the command outputting portion and the means which generates an operation command to the robot.

In the modification described above, two of the robots 16 are installed, i.e., the robots 16A and 16B, that wait in different standby postures. Then, the controller 28 determines the standby posture up to the start of the lifting process of the robot 16 based on the range image corresponding to the detection result of the three-dimensional sensor 18, and selects from the robots 16A and 16B the robot 16 that is waiting in the determined standby posture. Subsequently, the controller 28 corrects the operation command so that the suction pad 166a of that selected robot 16 lifts and moves the shallot 12 transported on the transport path. With this arrangement, it is possible to selectively use from the robots 16A and 16B the robot 16 that waits in the standby posture capable of reliably and quickly lifting the shallot 12. As a result, misses of the shallot 12 can be reliably prevented, thereby reliably improving productivity.

(2-2) When the Installation Area of the Robot is Determined and the Robot is Selected Accordingly While in second embodiment the lifting method of the shallot 12 is determined based on the range image corresponding to the detection result of the three-dimensional sensor 18 and the robot 16 is selected accordingly, the present disclosure is not limited thereto. That is, the controller 28 may determine the installation area of the robot 16 based on the range image corresponding to the detection result of the three-dimensional sensor 18 and select the robot 16 accordingly.

Figure 16:
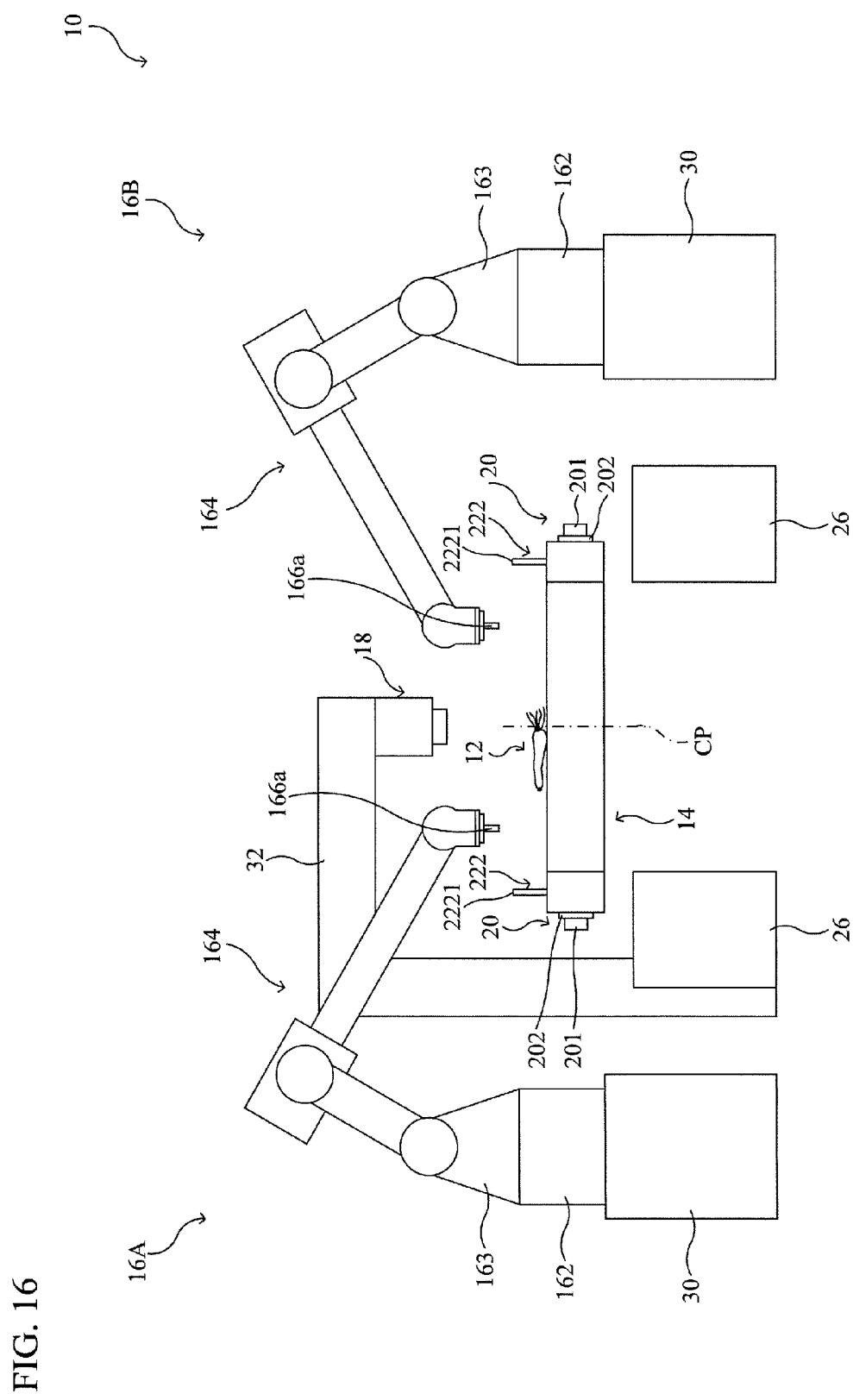
FIG. 16 is a side view schematically showing the overall configuration of the robot system of a modification wherein the robot installation area is determined and the robot is selected accordingly.

As shown in FIG. 16, in this modification, the tool installed at the end of the arm 164 of the robot 16B and the control contents of the controller 28 (refer to FIG. 1) differ from those of second embodiment. That is, in this modification, the same suction pad 166a as that of the robot 16A is installed to the end of the arm 164 of the robot 16B.

Figure 17:
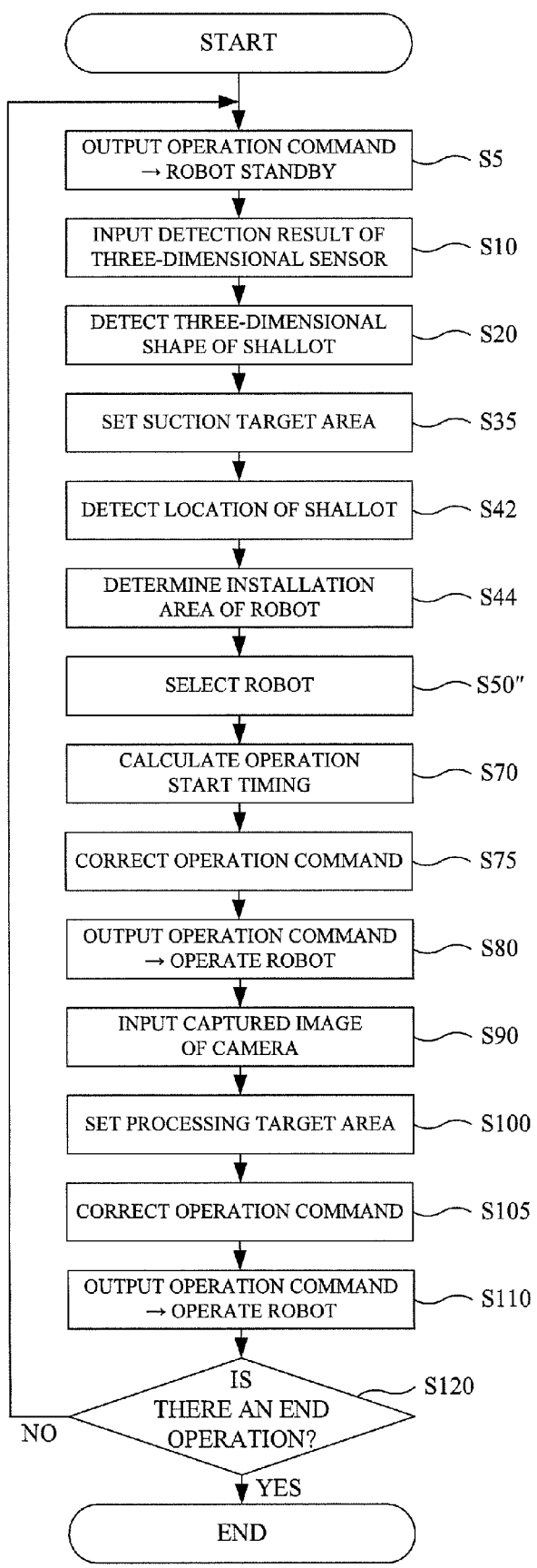
FIG. 17 is a flowchart showing an example of the control details executed by the controller.

The following describes an example of the control contents executed by the controller 28 of this modification using FIG. 17. Note that FIG. 17 is a figure that corresponds to the above FIG. 13 and FIG. 15, the same procedures as those in FIG. 13 and FIG. 15 are denoted using the same reference numerals, and descriptions thereof are suitably omitted or simplified.

In FIG. 17, the steps S5, S10, and S20 are the same as those in FIG. 13. Further, step S35 is the same as that in FIG. 15, and the flow proceeds to step S42 once the suction target area of the specific shallot 12 is set in step S35.

In step S42, the controller 28 detects the width position of the transport path of the conveyor 14 corresponding to the suction target area of the specific shallot 12 transported on the transport path, based on the setting in step S35. Specifically, the controller 28 detects whether the suction target area is on one side (the left side in FIG. 16) or the other side (the right side of the FIG. 16) of a center portion CP (refer to FIG. 16) in the width direction of the transport path of the conveyor 14.

Subsequently, in step S44, the controller 28 determines the installation area of the robot 16 to be selected, as the processing mode of the lifting process of the specific shallot 12, based on the detection result of the step S42. For example, in the step S42, in a case where the suction target area is detected on one side of the width center portion CP of the transport path, the controller 28 determines that the installation area of the robot 16 to be selected is the area on the one side in the width direction of the transport path. On the other hand, in the step S42, in a case where the suction target area is detected on the other side of the center portion CP in the width direction of the transport path, the controller 28 determines that the installation area of the robot 16 to be selected is the area on the other side in the width direction of the transport path.

Then, the flow proceeds to step S50" where the controller 28 selects from the robots 16A and 16B the robot 16 (equivalent to the third robot) that is installed in the installation area of the robot 16 determined in the step S44 as the robot 16 to perform the task on the specific shallot 12. For example, in the step S44, in a case where the installation area of the robot 16 is determined to be the area on the one side in the width direction of the transport path, the robot 16A installed in the area on the one side in the width direction of the transport path that is capable of reliably approaching the suction target area on the one side of the width center portion CP of the transport path and offers a shorter approach time to the suction target area (i.e., shorter tact time) is selected. On the other hand, in the step S44, in a case where the installation area of the robot 16 is determined to be the area on the other side in the width direction of the transport path, the robot 16B installed in the area on the other side in the width direction of the transport path that is capable of reliably approaching the suction target area on the other side of the width center portion CP of the transport path and offers a shorter approach time to the suction target area (i.e., shorter tact time) is selected. Note that the procedure of this step S50" functions as the third robot selecting portion described in the claims.

The subsequent procedures following step S70 are substantially the same as those in FIG. 13, and descriptions thereof will be omitted.

Note that, in the above, the procedures of step S42 and step S44 function as the mode determining portion described in the claims, with the procedure of step S42 functioning as the location detecting portion, and the procedure of step S44 functioning as the area determining portion. Further, the procedures of step S75 and step S105 function as the operation correcting portion and the means which corrects the operation command based on a detection result by the first detecting means described in the claims. Further, the procedures of step S80 and step S110 function as the command outputting portion and the means which generates an operation command to the robot.

In the modification described above, two of the robots 16 are installed, i.e., the robots 16A and 16B provided in the areas on one side and the other side of the transport path in the width direction. Then, the controller 28 detects the location in the width direction of the transport path of the shallot 12 transported on the transport path, based on the range image corresponding to the detection result of the three-dimensional sensor 18. Then, based on that detection result, the controller 28 determines the installation area of the robot 16, and selects from the robots 16A and 16B the robot 16 that is installed in the determined installation area. Subsequently, the controller 28 corrects the operation command so that the suction pad 166a of that selected robot 16 lifts and moves the shallot 12 transported on the transport path. With this arrangement, it is possible to selectively use from the robots 16A and 16B the robot 16 that is installed in the installation area that permits reliable and quick lifting of the shallot 12. As a result, misses of the shallot 12 can be reliably prevented, thereby reliably improving productivity.

(2-3) When Only One Robot is Installed

While in the above the configuration comprises two installed robots 16, the present disclosure is not limited thereto, allowing a configuration in which only one robot 16 is installed.

Figure 18:
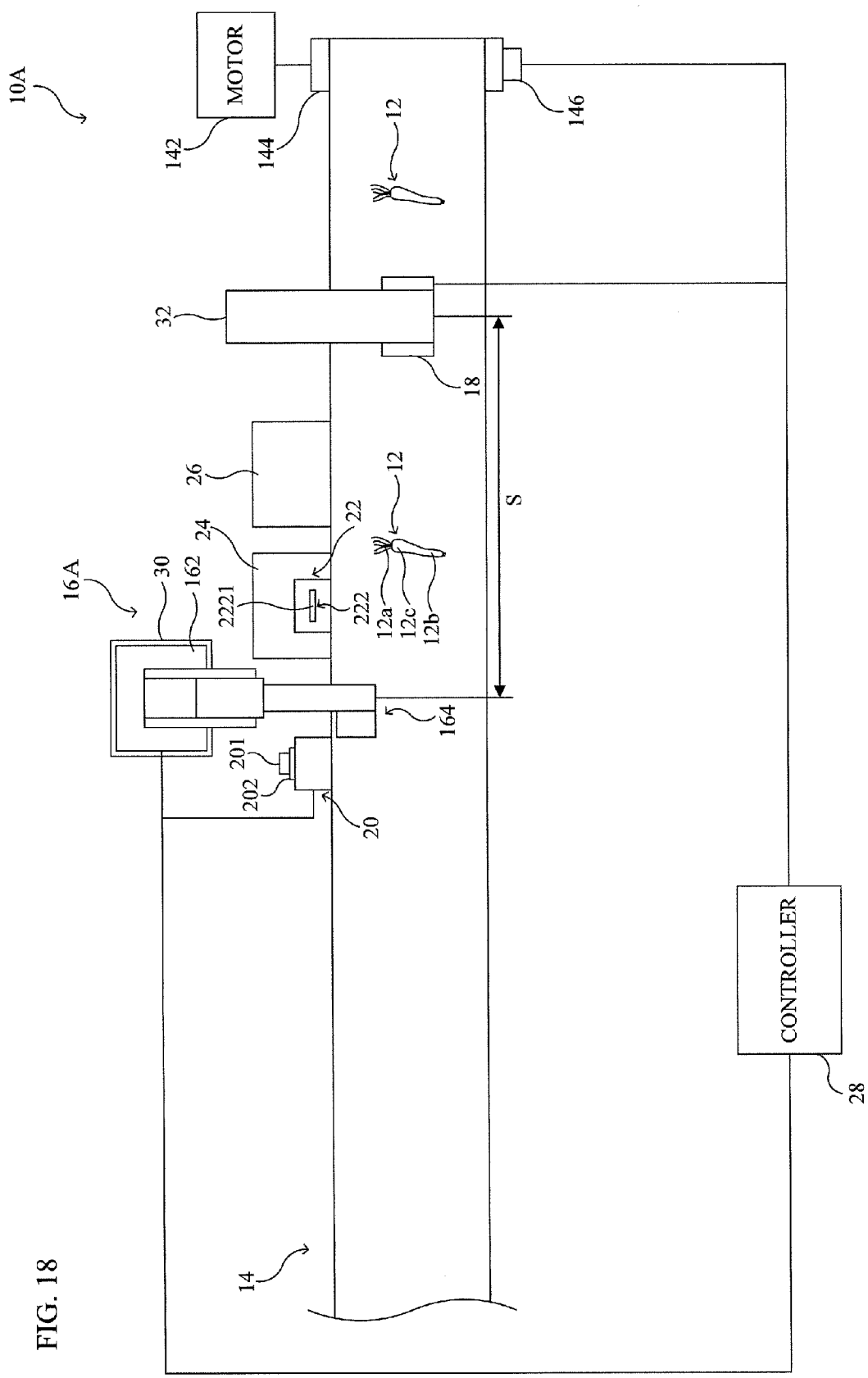
FIG. 18 is a side view schematically showing the overall configuration of the robot system of a modification wherein only one robot is installed.
Figure 19:
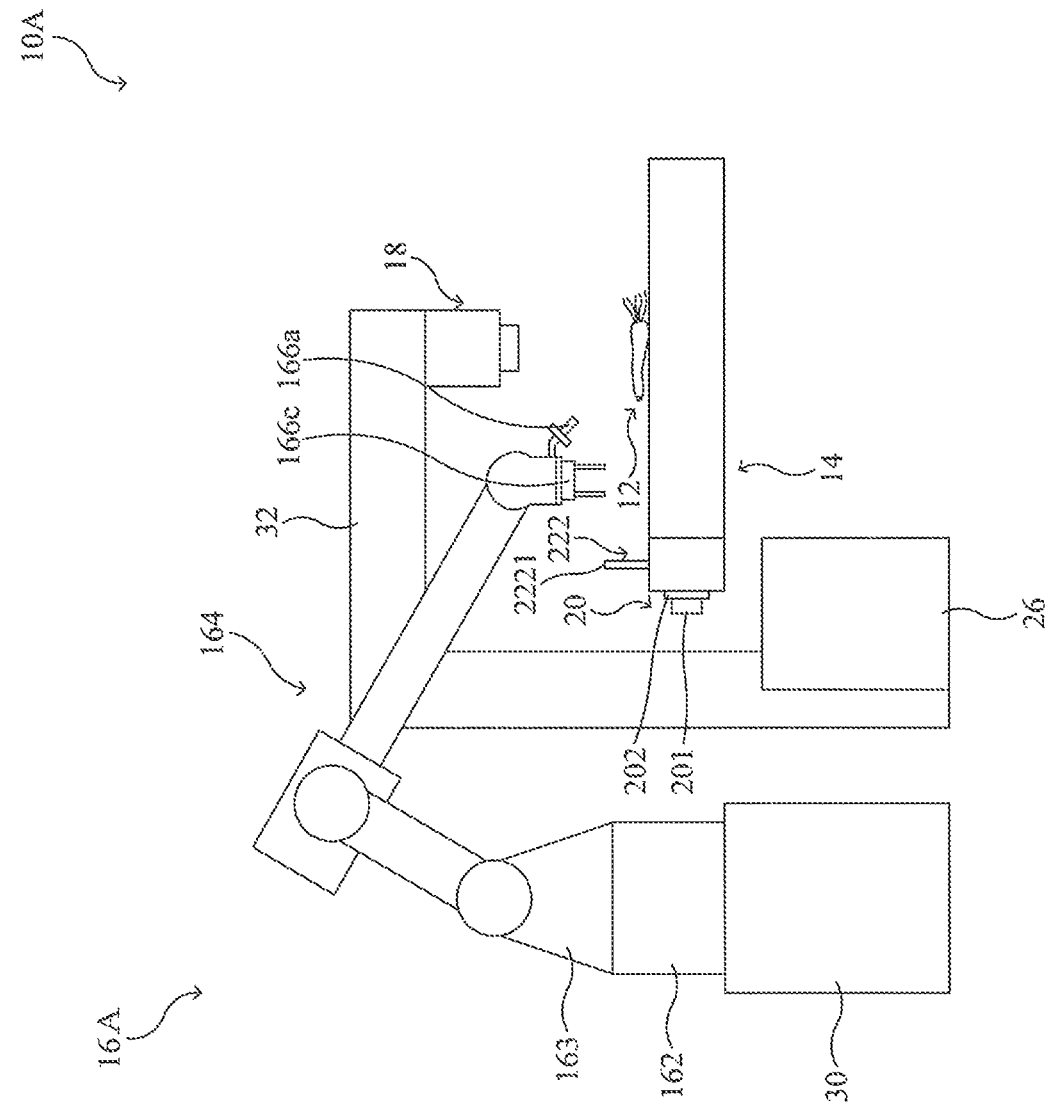
FIG. 19 is a side view schematically showing the overall configuration of the robot system.

As shown in FIG. 18 and FIG. 19, a robot system 10A (robot system) of this modification comprises the conveyor 14, the three-dimensional sensor 18, the robot 16A, and the controller 28.

On the robot 16A of this modification, the suction pad 166a and the hand 166c are installed as a plurality of tools (two in this example) involving different lifting methods at the end of the arm 164. The camera 20, the cutter 22, the discard box 24, and the input box 26 are installed around this robot 16A.

Further, the storage device of the controller 28 of this modification stores a plurality of operation commands inputted in advance via a teach pendant or the like, for example. This plurality of operation commands includes operation commands that do not specify the tool type for the task of lifting and moving the shallot 12 transported on the transport path via a tool.

Figure 20:
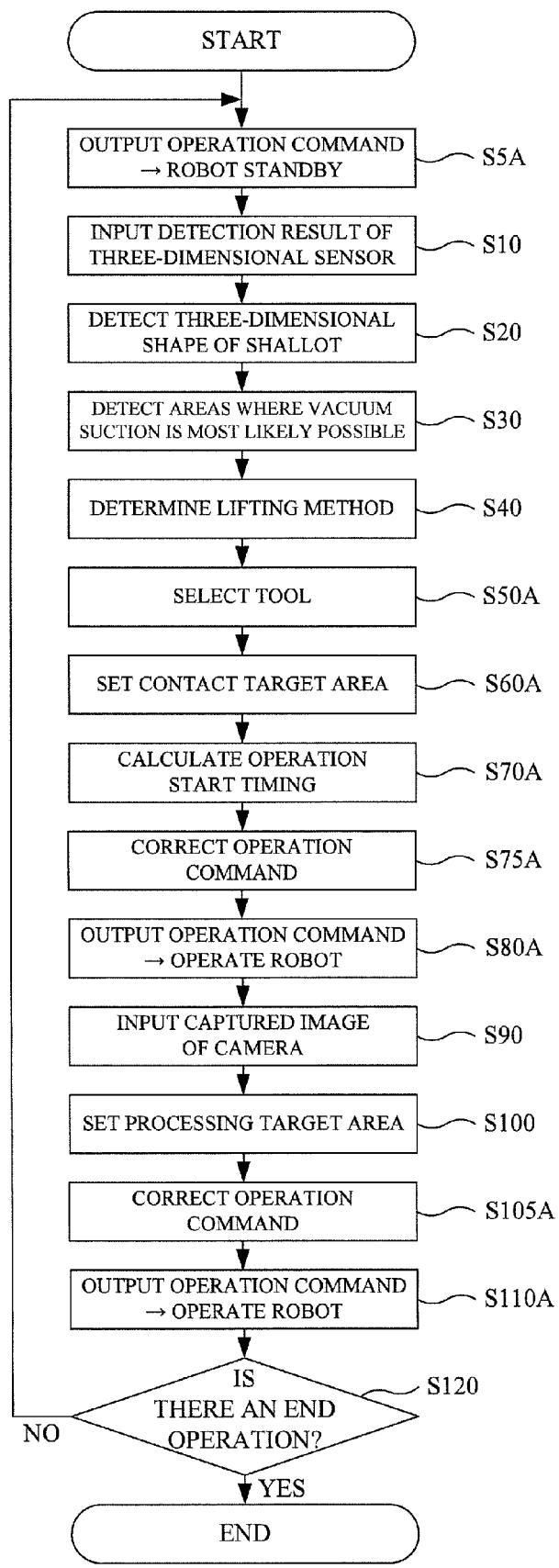
FIG. 20 is a flowchart showing an example of the control details executed by the controller.

The following describes an example of the control contents executed by the controller 28 of this modification using FIG. 20. Note that FIG. 20 is a figure that corresponds to the above FIG. 13, the same procedures as those in FIG. 13 are denoted using the same reference numerals, and descriptions thereof are suitably omitted or simplified.

In FIG. 20, first, in step S5A, the controller 28 outputs a predetermined operation command stored in a storage device to the robot 16A so that the robot 16A assumes a predetermined standby posture (the posture indicated in FIG. 19, for example). As a result, the robot 16A operates the swing base 163 and the arm 164 in coordination, assumes the predetermined standby posture, and waits.

The subsequent steps S10 to S40 are the same as those in FIG. 13. Then, the flow proceeds to step S50A once the lifting method of the specific shallot 12 is determined in step S40. Note that, in this modification as well, the procedure of this step S40 functions as the mode determining portion described in the claims.

In step S50A, the controller 28 selects from the two tools provided to the robot 16A (that is, the suction pad 166a or the hand 166c) the tool that corresponds to the lifting method determined in the step S40 (equivalent to the second tool; hereinafter suitably referred to as the "specific tool") as the tool that is to perform the task of lifting the specific shallot 12. For example, in the step S40, in a case where the lifting method is determined to be vacuum suctioning, the suction pad 166a, which serves as a tool that performs vacuum suctioning, is selected. On the other hand, in the step S40, in a case where the lifting method is determined to be clamping, the hand 166c, which serves as a tool for clamping, is selected. Note that the procedure of this step S50A functions as the tool selecting portion described in the claims.

Subsequently, in step S60A, the controller 28 sets the contact target area of the specific shallot 12 in accordance with the selection result of the step S50A. For example, in a case where the suction pad 166a is selected in the step S50A, from the areas of the specific shallot 12 that were detected in the step S30 as areas that can most likely be vacuum suctioned, the controller 28 sets the area that satisfies predetermined conditions as the suction target area of the specific shallot 12. On the other hand, in a case where the hand 166c is selected in the step S50A, the controller 28 sets the suitable area of the bulb portion 12c of the specific shallot 12 as the clamping target area of the specific shallot 12.

Then, the flow proceeds to step S70A where the controller 28, similar to the step S70, calculates the timing at which the specific shallot 12 will be transported within the movable area of the tool selected in the step S50A (in other words, the operation start timing of the robot 16A). The procedure of this step S70A functions as the timing calculating portion.

Subsequently, in step S75A, the controller 28 reads the operation command related to the step S75A stored in the storage device, and corrects the read operation command for the specific tool. That is, the operation command is corrected so that, when the operation start timing calculated in the step S70A arrives, the swing base 163 and the arm 164 operate in coordination, the specific tool contacts the contact target area of the specific shallot 12, and the specific shallot 12 is lifted and moved to the image capturing location of the camera 20. For example, in a case where the suction pad 166a is selected in the step S50A, the operation command is corrected for the suction pad 166a so that suction pad 166a contacts the suction target area of the specific shallot 12 and the specific shallot 12 is lifted and moved to the image capturing location by vacuum suction. On the other hand, in a case where the hand 166c is selected in the step S50A, the operation command is corrected for the hand 166c so that the hand 166c contacts the clamping target area of the specific shallot 12 and the specific shallot 12 is lifted and moved to the image capturing location by clamping.

Subsequently, in step S80A, the controller 28 outputs the operation command after correction in the step S75A to the robot 16A. With this arrangement, the specific robot 16A operates the swing base 163 and the arm 164 in coordination when the operation start timing arrives, based on the operation command from the controller 28. As a result, the specific tool contacts the contact target area of the specific shallot 12 transported on the transport path, and lifts and moves the specific shallot 12 to the image capturing location related to the adjacent camera 20. For example, in a case where the suction pad 166*a* is selected in the step S50A, the suction pad 166*a* contacts the suction target area of the specific shallot 12 and the specific shallot 12 is lifted and moved to the image capturing location by vacuum suction. On the other hand, in a case where the hand 166*c* is selected in the step S50A, the hand 166*c* contacts the clamping target area of the specific shallot 12 and the specific shallot 12 is lifted and moved to the image capturing location by clamping.

The subsequent steps S90 and S100 are the same as those of FIG. 13, and the flow proceeds to step S105A once the processing target area of the specific shallot 12 is detected in step S100.

In step S105A, the controller 28 reads the operation command related to the step S105A stored in the storage device, and corrects the operation command thus read. Specifically, the read operation command is corrected for the specific tool so that the processing target area of the specific shallot 12 lifted by the specific tool is guided to the location of the blade 2221. For example, in a case where the suction pad 166*a* is selected in the step S50A, the controller 28 corrects the operation command for the suction pad 166*a* so that the processing target area of the specific shallot 12 lifted by the suction pad 166*a* is guided to the location of the blade 2221. On the other hand, in a case where the hand 166*c* is selected in the step S50A, the controller 28 corrects the operation command for the hand 166*c* so that the processing target area of the specific shallot 12 lifted by the hand 166*c* is guided to the location of the blade 2221.

Then, the flow proceeds to step S110A where the controller 28 outputs the operation command after correction in the step S105 to the robot 16A. With this arrangement, the robot 16A operates the swing base 163 and the arm 164 in coordination based on the operation command from the controller 28, guides the processing target area of the specific shallot 12 lifted by the specific tool to the location of the blade 2221, and performs a predetermined operation. For example, in a case where the suction pad 166*a* is selected in the step S50A, the robot 16A guides the processing target area of the specific shallot 12 lifted by the suction pad 166*a* to the location of the blade 2221, and performs a predetermined operation. On the other hand, in a case where the hand 166*c* is selected in the step S50, the robot 16A guides the processing target area of the specific shallot 12 lifted by the hand 166*c* to the location of the blade 2221, and performs a predetermined operation.

The subsequent step S120 is the same as that in FIG. 13, and descriptions thereof will be omitted.

Note that, in the above, the procedures of step S75A and step S105A function as the operation correcting portion and the means which corrects the operation command based on a detection result by the first detecting means described in the claims. Further, the procedures of step S80A and step S110A function as the command outputting portion and the means which generates an operation command to the robot.

In the modification described above, the single robot 16A comprises the suction pad 166*a* and the hand 166*c*. Then, the controller 28 determines the lifting method of the shallot 12 based on the range image corresponding to the detection result of the three-dimensional sensor 18. Then, the controller 28 selects from the suction pad 166*a* and the hand 166*c* the tool corresponding to the determined lifting method. Subsequently, the controller 28 corrects the operation command so that the selected tool lifts and moves the shallot 12 transported on the transport path. As a result, the robot 16A can selectively use from the suction pad 166*a* and the hand 166*c* the tool corresponding to the lifting method capable of reliably and quickly lifting the shallot 12. As a result, misses of the shallot 12 can be reliably prevented, thereby reliably improving productivity.

(2-4) Other

While, according to the embodiment, the suction pad 166*a* is installed to the arm 164 of the robot 16A, and the hand 166*c* is installed to the arm 164 of the robot 16B, the present disclosure is not limited thereto. That is, a barbed member capable of lifting the shallot 12 by piercing as the predetermined lifting method may be installed as a tool in place of the suction pad 166*a* to the arm 164 of the robot 16A. Or, the barbed member may be installed as a tool in place of the hand 166*c* to the arm 164 of the robot 16B. Installation of the barbed member to the arm 164 of the robot 16A or the robot 16*b* makes it possible to lift the shallot 12 by piercing. With this arrangement, it is possible to reduce the tact time compared to a case where the shallot 12 is lifted by the clamping of the hand 166*c*.

Further, while according to the embodiment the suction pad 166*a* is installed to the arm 164 of the robot 16A, and the hand 166*c* is installed to the arm 164 of the robot 16B, the present disclosure is not limited thereto. That is, the suction pads 166*a* that differ in the amount of vacuum suction (vacuum suction force) may be installed to the arms 164 of the robots 16A and 16B.

Further, while in the modifications (2-1) and (2-2) the suction pad 166*a* is installed to the arm 164 of each of the robots 16A and 16B, the present disclosure is not limited thereto. That is, the hand 166*c* or the barbed member may be installed in place of the suction pad 166*a* to the arm 164 of each of the robots 16A and 16B.

Further, while in the modification of (2-3) the suction pad 166*a* and the hand 166*c* are installed to the arm 164 of the robot 16A, the present disclosure is not limited thereto. That is, the barbed member may be installed in place of the suction pad 166*a* or the hand 166*c* to the arm 164 of the robot 16A. Or, the barbed member may be installed in addition to the suction pad 166*a* or the hand 166*c* to the arm 164 of the robot 16A. Or, two of the suction pads 166*a* that differ in the amount of vacuum suction (vacuum suction force) may be installed to the arm 164 of the robot 16A.

Further, while in the above the controller 28 performed the various operations and processing in batch form, the present disclosure is not limited thereto, allowing the various operations and processing to be performed separately by a device other than the controller 28. For example, a first image processor, a second image processor, a robot controller, and a controller (such as a PC or PLC for example) that controls these may be installed. Then, the first image processor may generate the range image and detect areas that can be vacuum suctioned based on the image captured by the camera of the three-dimensional sensor 18 and the distance information of that captured image; the second image processor may detect the shape and posture of the shallot 12 based on the captured image of the camera 20; and the robot controller may perform processing related to the operation control of the robot 16, such as determine the processing mode of the lifting process, select the robot 16 or the tool, correct the operation command, and output the operation command. In this case, the first image processor, the second image processor provided to each of the cameras 20, the robot controller provided to each of the robots 16, and the controller that controls these are equivalent to the controller described in the claims.

Further, while in the above the shallot 12, which is an inconsistent object, is lifted and moved, the present disclosure is not limited thereto. That is, an inconsistent object such as a natural object such as a vegetable or fruit other than the shallot 12 or an artificial object (industrial product) having a mixed plurality of types may be lifted and moved. In such a case, the inconsistent object such as the natural object such as a vegetable or fruit other than the shallot 12, or the artificial object having a mixed plurality of types, is equivalent to the object described in the claims. Further, the object is not limited to an object with an inconsistent shape, allowing objects of a regular shape as well. In such a case, the regular shaped object is equivalent to the object described in the claims.

Further, in a case where the task of lifting and moving an object comprising a magnetic substance such as iron is performed, an electromagnet capable of lifting the object comprising a magnetic substance such as iron by electromagnetic attachment (equivalent to the predetermined lifting method) may be installed to the arm 164 of the robot 16. In such a case, the electromagnet is equivalent to the suctioning device and the tool described in the claims.

Further, while two of the robots 16 are installed in the embodiment and modifications (2-1) and (2-2), the present disclosure is not limited thereto, allowing installation of three or more of the robots 16. Further, while a single robot 16 is installed in the modification (2-3), the present disclosure is not limited thereto, allowing installation of two or more of the robots 16.

Further, in the above, a case where the task of lifting and moving the shallot 12 transported on the transport path is performed is described as an example of the predetermined task. Nevertheless, the present disclosure is not limited thereto, allowing application of the above technique to cases where the predetermined task performed is, for example, a task of applying adhesive, coating, or the like to an object, a task of removing an unnecessary area of an object, or a task of branding an object. Even in cases of application to such tasks, it is possible to perform the task reliably and accurately by correcting the operation command based on the detection result of the three-dimensional sensor, and outputting the corrected operation command to the robot to be operated. As a result, similar to second embodiment, productivity is improved.

Further, the flow shown in FIG. 13, etc., is not limited to the procedures shown in the embodiments, allowing procedures to be added, deleted, and changed in order without departing from the spirit and scope of the disclosure.

Further, other than that already stated above, techniques based on the above embodiments and each of the modifications may be suitably combined as well.

Although other examples are not individually described herein, various changes can be made to the above embodiments and modifications without departing from the spirit and scope of the present disclosure.

What is claimed is:

1. A robot system, comprising:
   a transport device which transports an object;
   a first sensor which detects a three-dimensional shape of the object transported on a transport path by the transport device;
   a robot which performs a predetermined task on the object transported on the transport path by the transport device; and
   a controller configured to operate the robot, wherein the controller comprises
      a command outputting portion which generates an operation command to the robot; and
      an operation correcting portion which corrects the operation command based on a detection result of the three-dimensional shape of the object by the first sensor, wherein
   the robot is configured to permit installation of a tool for performing a task of lifting and moving the object by a predetermined lifting method as the predetermined task;
   the controller comprises a mode determining portion which determines a processing mode of a lifting process by the tool for the object transported on the transport path, based on the detection result by the first sensor;
   the operation correcting portion corrects the operation command so that the object transported on the transport path is lifted and moved by the tool, in accordance with the processing mode of the lifting process determined by the mode determining portion;
   a plurality of the robots are installed;
   the robot of among the plurality of robots which is installed furthest upstream on the transport path is installed so that an area where the lifting process is to be performed by the tool is separated from a detection area of the object by the first sensor by a predetermined distance or longer along the transport path, on a downstream side of the transport path.

2. The robot system according to claim 1, wherein the first sensor comprises
   a laser light source which is oriented so that laser light of a linear beam is emitted to a predetermined location on a transport surface of the transport device; and
   a camera which captures an image of an emitted location of the laser light by the laser light source and a surrounding area thereof.

3. The robot system according to claim 1, wherein
   the mode determining portion determines the lifting method as the processing mode of the lifting process based on three-dimensional information corresponding to the detection result by the first sensor;
   the controller further comprises a first robot selecting portion which selects among the plurality of robots a first robot to which a tool corresponding to the lifting method determined by the mode determining portion is installed;
   the operation correcting portion corrects the operation command so that the object transported on the transport path is lifted and moved by the tool installed to the first robot; and
   the command outputting portion outputs the operation command after correction by the operation correcting portion to the first robot.

4. The robot system according to claim 1, wherein
   the mode determining portion determines a standby posture up to start-up of the lifting process of the robot as the processing mode of the lifting process, based on three-dimensional information corresponding to the detection result by the first sensor;
   the controller further comprises a second robot selecting portion which selects among the plurality of robots a second robot which waits in the standby posture determined by the mode determining portion;
   the operation correcting portion corrects the operation command so that the object transported on the transport path is lifted and moved by the tool installed to the second robot; and
   the command outputting portion outputs the operation command after correction by the operation correcting portion to the second robot.

5. The robot system according to claim 1, wherein
the robots are installed in plurality from one side area to another side area in a width direction of the transport path;
the mode determining portion comprises:
  a location detecting portion which detects a location of the object transported on the transport path in the width direction of the transport path, based on three-dimensional information corresponding to the detection result by the first sensor; and
  an area determining portion which determines an installation area of the robot as the processing mode of the lifting process, based on a detection result by the location detecting portion;
the controller further comprises a third robot selecting portion which selects among the plurality of robots a third robot which is installed in the installation area determined by the area determining portion;
the operation correcting portion corrects the operation command so that the object transported on the transport path is lifted and moved by the tool installed to the third robot; and
the command outputting portion outputs the operation command after correction by the operation correcting portion to the third robot.

6. The robot system according to claim 1, wherein
the robot is configured to permit installation of plural kinds of the tools which differs each other;
the mode determining portion determines the lifting method as the processing mode of the lifting process, based on three-dimensional information corresponding to a detection result by the first sensor;
the controller further comprises a tool selecting portion which selects among the plurality of tools a second tool corresponding to the lifting method determined by the mode determining portion; and
the operation correcting portion corrects the operation command so that the object transported on the transport path is lifted and moved by the second tool.

7. The robot system according to claim 1, wherein
the controller comprises:
  a first setting portion which sets a contact target area of the object transported on the transport path, based on the detection result by the first sensor;
  a first control portion which controls the robot so that the tool is made to contact the contact target area of the object when the object is transported within a movable range of the tool installed to the robot, and lift and move the object to a predetermined location;
  a second sensor which detects a posture of the object that has been moved to the predetermined location;
  a second setting portion which sets a processing target area of the object lifted by the tool of the robot, based on a detection result by the second sensor; and
  a second control portion which controls the robot so that the processing target area of the object lifted by the tool is guided to a location where the processing is to be performed.

8. The robot system according to claim 7, wherein
the transport device comprises:
  a motor;
  a drive portion rotationally driven by the motor; and
  an encoder which is connected to the drive portion and detects a rotational position of the drive portion; and
the first control portion calculates an operation start timing of the robot, based on a detection result by the encoder.

9. The robot system according to claim 8, wherein
the second sensor is an image capturing device which captures an image of the object that has been moved to the predetermined location; and
the second setting portion sets the processing target area of the object, based on a captured image by the image capturing device.

10. The robot system according to claim 8, wherein
the tool of the robot is a suctioning device capable of lifting the object by suction; and
the first setting portion sets a suction target area as the contact target area of the object.

11. The robot system according to claim 8, further comprising:
a cutter comprising a blade which cuts the object as the processing;
wherein
  the second control portion controls the robot so that the processing target area of the object lifted by the tool of the robot is guided to a location of the blade of the cutter as a location where the processing is to be performed.

12. A robot system, comprising:
transport means which transports an object;
first detecting means which detects a three-dimensional shape of the object transported on a transport path by the transport means;
a robot which performs a predetermined task on the object transported on the transport path by the transport means; and
means which generates an operation command to the robot; and
means which corrects the operation command based on a detection result of the three-dimensional shape of the object by the first detecting means, wherein
the robot is configured to permit installation of a tool for performing a task of lifting and moving the object by a predetermined lifting method as the predetermined task;
the controller comprises means for determining a processing mode of a lifting process by the tool for the object transported on the transport path, based on the detection result by the first detecting means;
the means which corrects the operation command corrects the operation command so that the object transported on the transport path is lifted and moved by the tool, in accordance with the processing mode of the lifting process determined by the means for determining a processing mode;
a plurality of the robots are installed;
the robot of among the plurality of robots which is installed furthest upstream on the transport path is installed so that an area where the lifting process is to be performed by the tool is separated from a detection area of the object by the first detecting means by a predetermined distance or longer along the transport path, on a downstream side of the transport path.

13. A processed object manufacturing method performed by use of a plurality of robots, comprising:
transporting the object on a transport path;
detecting three-dimensional shape of the object transported on the transport path using a first sensor;
determining a processing mode of a lifting process by a tool installed to the robot for the object transported on the transport path, based on the detection result by the first sensor;
controlling the robot so that the tool is made to contact a contact target area of the object when the object is transported within a movable range of the tool, in accordance with the processing mode of the lifting process determined in the mode determining, and lift and move the object to a predetermined location;
detecting a posture of the object that has been moved to the predetermined location by a second sensor;
setting a processing target area of the object lifted by the tool of the robot, based on a detection result by the second sensor; and
controlling the robot so that the processing target area of the object lifted by the tool is guided to a location where the processing is to be performed, wherein
the robot of among the plurality of robots which is installed furthest upstream on the transport path is installed so that an area where the lifting process is to be performed by the tool is separated from a detection area of the object by the first sensor by a predetermined distance or longer along the transport path, on a downstream side of the transport path.

\* \* \* \* \*